(12) United States Patent
Takakura et al.

(10) Patent No.: US 7,515,761 B2
(45) Date of Patent: Apr. 7, 2009

(54) ENCODING DEVICE AND METHOD

(75) Inventors: Kentaro Takakura, Takatsuki (JP);
Shinji Kitamura, Nagaokakyo (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 10/714,358

(22) Filed: Nov. 14, 2003

(65) Prior Publication Data
US 2004/0105497 A1    Jun. 3, 2004

(30) Foreign Application Priority Data
Nov. 14, 2002    (JP) ............... 2002-331140

(51) Int. Cl.
G06K 9/46    (2006.01)
H03M 7/00   (2006.01)
H04N 1/413  (2006.01)

(52) U.S. Cl. ............... 382/244; 341/59; 358/426.13

(58) Field of Classification Search ......... 382/232, 382/239, 244–246; 341/59; 358/426.13
See application file for complete search history.

(56) References Cited

U.S. PATENT DOCUMENTS 5,694,127 A * 12/1997 Tayama .................. 341/67
6,961,474 B1 * 11/2005 Hirano et al. ........... 382/246
7,142,720 B1 * 11/2006 Fukuda et al. .......... 382/232

FOREIGN PATENT DOCUMENTS

| JP | WO99/44368 | * | 9/1999 |
| JP | 2000-050271 |   | 2/2000 |

* cited by examiner

Primary Examiner—Matthew C Bella
Assistant Examiner—Nathan Bloom
(74) Attorney, Agent, or Firm—Hamre, Schumann, Mueller & Larson, P.C.

(57) ABSTRACT

It is an object of the present invention to provide an encoding device and an encoding method that allow even faster speeds to be achieved by reducing the waiting time during which variable-length encoding is performed. An encoding device performing run-length encoding and variable-length encoding sequentially inputs one block of m×n data, determines whether a value of each unit of input data is 0 (zero), stores the results of the determination to an information register and stores input data to a data buffer, controls the reading of data from the data buffer based on the results of the determination, performs run-length encoding using the data read from the data buffer and the results of the determination, and performs variable-length encoding using as a data pair the data and the number of consecutive data having a value of 0 (zero).

23 Claims, 30 Drawing Sheets

| Address difference | | Number of data having the value 0 (zero) |
|---|---|---|
| 1 – 2 | = | 0 |
| 2 – 17 | = | 1 |
| 17 – 11 | = | 3 |
| 11 – 26 | = | 3 |
| 26 – 20 | = | 5 |
| 20 – 41 | = | 2 |

FIG. 9

| A0 | A1 | A2 | A3 | A4 | A5 | A6 | A7 |
|---|---|---|---|---|---|---|---|
| 1, 2 | 9, 17 | 10, 3 | 4, 11 | 18, 25 | 33, 26 | 19, 12 | 5, 6 |
| A8 | A9 | A10 | A11 | A12 | A13 | A14 | A15 |
| 13, 20 | 27, 34 | 41, 49 | 42, 35 | 28, 21 | 14, 7 | 8, 15 | 22, 29 |
| A16 | A17 | A18 | A19 | A20 | A21 | A22 | A23 |
| 36, 43 | 50, 57 | 58, 51 | 44, 37 | 30, 23 | 16, 24 | 31, 38 | 45, 52 |
| A24 | A25 | A26 | A27 | A28 | A29 | A30 | A31 |
| 59, 60 | 53, 46 | 39, 32 | 40, 47 | 54, 61 | 65, 55 | 48, 56 | 63, 64 |

ENCODING DEVICE AND METHOD

BACKGROUND OF THE INVENTION

1. Field of the Invention

The present invention relates to encoding devices and methods using both run-length encoding and variable-length encoding, and in particular relates to encoding devices and methods in which image compression technologies for compressing image data are used.

2. Description of the Related Art

Encoding methods using run-length encoding and variable-length encoding are employed by JPEG (Joint Photographic Experts Group) and MPEG (Moving Picture Experts Group), which are general compression technologies for image data, and with the popularity of digital cameras and digital video cameras and the advances in communications technology, for example, these encoding methods have become widespread as technologies that allow data to be transferred in small information amounts.

FIG. 30 shows a representative configuration of a conventional image compression device. In FIG. 30, a DCT (discrete cosine transform) portion 801 performs frequency conversion with respect to image data that have already been separated into 8×8 units per block and received in order, creating DCT coefficients.

In general, the change in color in the majority of natural images is smooth. Consequently, in a DCT coefficient distribution, such as that shown in FIG. 31, created by performing frequency conversion, DCT coefficients having large values are concentrated in the low frequency region f and DCT coefficients having small values are distributed over the high frequency region g.

With respect to the DCT coefficients that are created, a quantizing portion 802 creates quantized coefficients by dividing the DCT coefficients by a quantizing value set in advance. Performing this processing allows the quantized coefficients to be concentrated in such a manner that the values in the high frequency region g, which does not affect the picture quality, become 0 (zero).

Also, in an encoding portion 803, code words with different lengths are allocated according to the appearance ratio of the combinations of the number of data units having a value of 0 (zero) and the values of the quantized coefficients, thereby reducing the overall data volume.

FIG. 32 is a diagram showing the configuration of the encoding portion 803 in the conventional image compression device. In FIG. 32, the quantized coefficients for the 8×8 units of data per block that are input from an input portion 804 are written to a data buffer 805 under the control of a write control portion 806, and are read out sequentially from the data buffer 805 under the control of a read control portion 807 through a zig-zag scan like that shown in FIG. 4.

With a run-length encoding portion 808, a comparing and determining portion 811 determines whether the quantized coefficients read out sequentially by the read control portion 807 are 0 (zero), and if a quantized coefficient is 0 (zero), then the number of quantized coefficients is counted by a run-length counter 812, and if there are none that are 0 (zero), then the run-length counter 812 is initialized to '0'. Then, a LEVEL signal that indicates the value of the quantized coefficient read out when the quantized coefficient is not 0 (zero) and a RUN signal that indicates the current number of quantized coefficients that are 0 (zero) that have been counted are output.

A variable-length encoding portion 809 performs variable-length encoding using the RUN signal and the LEVEL signal, which are the signals output by the run-length encoding portion 808, and outputs the encoded data.

With the configuration described above, however, encoding is carried out using both the LEVEL signal and the RUN signal. Consequently, encoding cannot be performed by the variable-length encoding portion 809 while consecutive quantized coefficients having a value of 0 (zero) are read out and the number of these consecutive quantized coefficients is counted by the run-length counter 812. For this reason, a waiting time occurs during the encoding process, leading to the problem that the speed of the overall encoding process cannot be increased.

Image compression devices such as that disclosed in JP 2000-50271A have been proposed as one solution to this problem.

In JP 2000-50271A, as shown in FIG. 33, DCT coefficients CF1 that have been quantized by a DCT/quantizing portion 21 are output. Also, a run-length counter 23 sets a zero flag ZF to '1' if the DCT coefficient CF1 is 0 (zero) and sets the zero flag ZF to '0' (zero) if the DCT coefficient CF1 is not 0 (zero).

A run-length RL1 indicates the number of consecutive values of 0 (zero) of the DCT coefficients CF1. Run-length encoding is carried out by finding the run-length RL1. That is, a run-length counter 23 corresponds to the run-length encoding portion 808 in FIG. 32 for finding the run-length.

A buffer controller 24 writes write data WD into an address WA of a buffer 22 in accordance with the zero flag ZF, the run-length RL1, and the DCT coefficient CF1.

If the DCT coefficient is not 0 (zero), then the write data WD is made of a most significant bit that is a zero flag='0' (zero) and the CF1.

If the DCT coefficient is 0 (zero), then the write data WD is made of a most significant bit that is the zero flag='1' and the run-length RL1.

If the zero flag ZF is consecutively '1', that is, if the DCT coefficient CF1 is consecutively '0' (zero), then, due to the address WA not changing, write data that is ultimately made of a zero flag='1' and the run-length RL1 can be stored only in one address.

The buffer controller 24 reads out data RD from the address RA of the buffer 22, and supplies the run-length RL2 and the DCT coefficient CF2 as one data set to a variable-length encoding portion 25.

With the image compression device disclosed in JP 2000-50271A, however, although the problem of not being able to continue the encoding process while consecutive quantized coefficients having a value of 0 (zero) are read out and the number of consecutive quantized coefficients is counted by the run-length counter 23 is solved, there are still the processes of writing the run-length RL1 to the buffer and reading the run-length RL2 from the buffer, and until the process of reading and writing the number of consecutive quantized coefficients having a value of 0 (zero) to and from the buffer is over, the encoding process cannot be carried out by the variable-length encoding portion 25. That is, although the time is shortened, a waiting period still occurs like in the conventional example, and thus the problem that a further increase in the overall speed of the encoding process cannot be achieved remains.

SUMMARY OF THE INVENTION

To solve the above problems, it is an object of the present invention to provide an encoding device and an encoding method that allow encoding to be carried out even faster by further reducing the waiting time during which variable-length encoding is performed.

To achieve the above object, an encoding device of the present invention is an encoding device performing run-length encoding and variable-length encoding that includes an input portion for sequentially inputting one block of m×n data, a comparing and determining portion for determining whether a value of each data input by the input portion is 0 (zero), an information register for storing determination result information on the results of the determination by the comparing and determining portion, a data buffer for storing data input by the input portion, a read control portion for controlling reading of the data from the data buffer in such a manner that only input data having a value that is not 0 (zero) are read out based on the determination result information stored in the information register, a run-length encoding portion for performing run-length encoding using data read from the data buffer and the determination result information stored in the information register, and a variable-length encoding portion for performing variable-length encoding using as a data pair the input data and the number of consecutive data having a value of 0 (zero) obtained by the run-length encoding portion.

With this configuration, it is possible to control the reading of data having a value of 0 (zero) in the data buffer based on the determination result information stored in the information register. Thus, the waiting time before variable-length encoding is performed can be shortened by the amount of time required for reading out data having a value of 0 (zero), allowing the overall speed of the encoding process to be increased.

Also, with the encoding device according to the present invention, it is preferable that the determination result information is stored in the information register in a zig-zag scan order with respect to the arrangement of the data in the block.

It is further preferable that the encoding device according to the present invention further includes a write control portion for controlling writing of the data to the data buffer, and that the write control portion permits writing to the data buffer only if the comparing and determining portion has determined that the value of the data is not 0 (zero). This is because write transfer can be reduced, allowing the usage efficiency of the data buffer to be improved.

With the encoding device according to the present invention, it is also preferable that the data buffer is configured so that it can store L (where L is a natural number of two or more) input data per address, and that the encoding device further includes a selection portion for selecting which data of the L input data that are read from the data buffer should be output to the run-length encoding portion based on the determination result information stored in the information register. Since the information register can be evaluated as a plurality of bits at a time, it is possible to determine simultaneously whether data of a plurality of consecutive bits have values of 0 (zero). Thus, the time that the data buffer is accessed is shortened, allowing the waiting time before variable-length encoding is performed to be shortened, and as a result, allowing the overall speed of encoding to be increased.

With the encoding device according to the present invention, it is also preferable that the information register is configured so that it can store m×n bits of determination result information, and that the read control portion reads those L input data from the data buffer only if at least one bit of the determination result information corresponding to L input data in the information register indicates that the value of the input data is not 0 (zero). It is also preferable that the selection portion, of the bits of the information register, selects L input data read from the data buffer based on L bits of determination result information corresponding to L input data.

With the encoding device according to the present invention, it is also preferable that the information register is configured so that it can store m×n bits of determination result information in mutually different arrangement orders, and an information register group is constituted by a plurality of the information registers, and that the encoding device further includes a second input portion for inputting characteristic information indicating block characteristics of the data input by the input portion, and a register selection portion for selecting any of the information registers of the information register group based on the characteristic information that is input from the second input portion. This is because the encoding process can be made faster even in variable-length encoding, which has a plurality of scans, such as MPEG-4.

The encoding device according to the present invention also preferably comprises an output switching portion having a plurality of process chains. One chain is constituted by the information register, the data buffer, the write control portion, and the read control portion, and which controls switching to the data buffer associated with which of the process chains from which to output to the run-length encoding portion. Preferably a process of writing to a data buffer of one of the process chains and a process of reading from a data buffer of another process chain are performed simultaneously. This is because by simultaneously writing and reading data, data can be transferred without waiting during reading from the data buffer, and thus the waiting time of the variable-length encoding process can be shortened, allowing the encoding process as a whole to be made faster.

The encoding device according to the present invention also preferably further includes a code word number counting portion for counting a number of input data that are not 0 (zero) based on the determination result information of the information register. Furthermore, it also preferably further includes a region setting portion for setting a region within a block that is to be counted by the code word number counting portion. This is because if rate control of encoded data is performed, then encoding can be performed again through a command from the outside without waiting for the variable-length encoding process to end.

It is also preferable that the encoding device according to the present invention also further includes a threshold value setting portion for setting a threshold value of the count number of the code word number counting portion and a comparing portion for comparing the count number and the threshold number. This is because since the count value and the threshold value can be compared during variable-length encoding, if the count value is equal to or greater than that threshold value, then encoding can be performed again without waiting for variable-length encoding to end, and this allows the waiting time of the variable-length encoding process to be shortened.

It is also preferable that the encoding device according to the present invention further includes a final data determination portion for outputting, when it is determined that an input data that is read from the data buffer is the last input data that is not 0 (zero) within the data block based on the determination result information stored in the information register, information indicating that that input data are the final data to the variable-length encoding portion. This is because it permits compatibility with three-dimensional variable-length encoding, which is used in MPEG-4.

It is also preferable that the encoding device according to the present invention also further includes a clock control portion for controlling supply of a clock to the data buffer, and that the clock control portion supplies a clock to the data buffer only during a period when the values of the input data are not 0 (zero) based on the determination result information stored in the information register.

Next, to achieve the above-stated objects, an encoding device according to the present invention is an encoding device performing run-length encoding and variable-length encoding that includes a first processing portion, a processor, and a second processing portion. The first processing portion includes an input portion for sequentially inputting one block of m×n data, a comparing and determining portion for determining whether the value of each data input by the input portion is 0 (zero), a first information register for storing first determination result information on the results of the determination by the comparing and determining portion, a first data buffer for storing data input by the input portion, and a write control portion for controlling writing of the data to the first data buffer. The processor reads the data from the first data buffer based on the information stored in the first information register to create second data. The second processing portion includes a second data buffer for storing the second data, a second information register for storing second determination result information on whether the values of the second data are 0 (zero), a read control portion for controlling reading of the second data from the second data buffer based on the second determination result information stored in the second information register, a run-length encoding portion for performing run-length encoding using the second data read from the second data buffer and the second determination result information stored in the second information register, and a variable-length encoding portion for performing variable-length encoding using as a data pair the second input data and the number of consecutive second input data having a value of 0 (zero) obtained by the run-length encoding portion. The read control portion reads only the second data having a value that is not 0 (zero) from the second data buffer based on the second determination result information of the second information register. The run-length encoding portion outputs to the variable-length encoding portion, as the number of consecutive second data having a value of 0 (zero), the interval in which the second determination result information in the second information register indicates that the value of the second data is not 0 (zero).

By adopting this configuration with the first processing portion and the second processing portion separated with the processor between them, the time for the reading process and the time for the writing process when transferring data between the two processing portions can be shortened, allowing the waiting time of the variable-length encoding process to be shortened. Thus, the overall speed of the encoding process can be increased.

In this encoding device according to the present invention, it is preferable that if the value of a created second data is 0 (zero), then, without outputting that second data, the processor increases the count of the number of second data having a value of 0 (zero), and if the value of a created second data is not 0 (zero), then the processor outputs the second data and outputs to the run-length encoding portion the number of second data having a value of 0 (zero) that have been counted.

Next, to achieve the above-stated objects, an encoding device according to the present invention is an encoding device performing run-length encoding and variable-length encoding that includes an input portion for sequentially inputting one block of m×n data, a comparing and determining portion for determining whether values of the data input by the input portion are 0 (zero), a data buffer for storing data input by the input portion, an address storage portion storing addresses in the data buffer of the data that are determined by the comparing and determining portion to have a value that is not 0 (zero), a read control portion for controlling reading of the input data from the data buffer based on the addresses stored in the address storage portion, a run-length encoding portion for performing run-length encoding using the input data read from the data buffer and the addresses stored in the address storage portion, and a variable-length encoding portion for performing variable-length encoding using as a data pair the data and the number of consecutive data having a value of 0 (zero) obtained by the run-length encoding portion. The read control portion reads only the data having a value that is not 0 (zero) from the data buffer based on the addresses stored in the address storage portion. The run-length encoding portion outputs to the variable-length encoding portion, as the number of data units having a value of 0 (zero), the difference between the previous address read from the address storage portion and the current address read from the address storage portion.

With this configuration, addresses only for data having a value that is not 0 (zero) in the data buffer based on the addresses stored in the address storage portion are output. Thus, the waiting time of the variable-length encoding process can be shortened by the amount of time required to read out data having a value that is 0 (zero), allowing the overall speed of the encoding process to be increased.

In this encoding device according to the present invention, it is preferable that the run-length encoding portion calculates, in the zig-zag scan order, a difference between the address read from the data buffer and the address that was read immediately prior, and outputs the difference to the variable-length encoding portion as the number of the data having a value of 0 (zero).

Furthermore, with this encoding device according to the present invention, it is preferable that the address storage portion and the read control portion are provided by a processor.

Next, to achieve the above-stated objects, an encoding method according to the present invention is an encoding method in which run-length encoding and variable-length encoding are performed, and includes a step of sequentially inputting one block of m×n data, a step of determining for each data that is input whether its value is 0 (zero), a step of storing determination result information on the results of the determination to an information register, a step of storing the input data to a data buffer, a step of selectively reading data from the data buffer in such a manner that only input data having a value that is not 0 (zero) are read out based on the determination result information stored in the information register, a step of performing run-length encoding using the data read from the data buffer and the determination result information, and a step of performing variable-length encoding using as a data pair the data and the number of consecutive data having a value of 0 (zero) obtained in the step of performing run-length encoding.

With this method, it is possible to control the reading of data having a value of 0 (zero) in the data buffer based on the determination result information stored in the information register. Thus, the waiting time before variable-length encoding is performed can be shortened by the amount of time required for reading out data having a value of 0 (zero), allowing the overall speed of the encoding process to be increased.

With the encoding method of the present invention, it is preferable that a buffer that can store L (L is a natural number of two or more) data per address is used as the data buffer, and that the step of selectively reading data from the data buffer includes a step of selecting which data, of the L data read from the data buffer, to transfer to the run-length encoding process based on the determination result information stored in the information register, and a step of transferring the selected data to the run-length encoding process. Since the determination result information of the information register can be evaluated as a plurality of bits at a time, it is possible to simultaneously determine whether data of a plurality of consecutive bits have values of 0 (zero), and thus the time that the data buffer is accessed is shortened. As a result, the waiting time until variable-length encoding is performed can be shortened, allowing the overall speed of the encoding process to be increased.

With the encoding method of the present invention, it is also preferable that the information register is configured so that it can store m×n bits of the determination result information in mutually different arrangement orders, that an information register group constituted by a plurality of the information registers is used, and that the encoding method further includes a step of inputting characteristic information showing the block characteristics in the input data, and a step of selecting an information register from the information register group based on the characteristic information that is input. This is because the encoding process can be made faster even in variable-length encoding, which has a plurality of scans, such as MPEG-4.

It is also preferable that the encoding method of the present invention further includes a step of simultaneously executing a plurality of process chains. Each process chain includes the step of storing the determination result information to the information register, the step of storing the input data to the data buffer, and the step of selectively reading data from the data buffer based on the determination results, and controlling which data read out from the data buffers in what process chain of the plurality of process chains are transferred to the run-length encoding step, and that writing to the data buffer in one of the plurality of process chains and reading from a data buffer in another process chain are performed simultaneously. This is because by simultaneously writing and reading data, data can be transferred without waiting the amount of time for reading from the data buffer. Thus the waiting time of the variable-length encoding process can be shortened, allowing the encoding process as a whole to be made faster.

It is also preferable that the encoding method of the present invention further includes a step of counting a number of input data whose values are not 0 (zero) based on the determination result information in the information register. It is also preferable that the encoding method of the present invention further includes a step of setting a region within one block to be subjected to the counting. This is because if rate control of encoded data is performed, then encoding can be performed again through a command from the outside without waiting for the variable-length encoding process to end.

It is also preferable that the encoding method of the present invention further includes a step of setting a threshold value of a count number and a step of comparing the count number and the threshold value. This is because since the count value and the threshold value can be compared during variable-length encoding, if the count value is equal to or greater than that threshold value, then encoding can be performed again without waiting for the variable-length encoding process to end, and this allows the waiting time of the variable-length encoding process to be shortened.

It is also preferable that the encoding method of the present invention further includes a step of determining whether an input data that is read from the data buffer is a last input data that is not 0 (zero) within the data block, based on the determination result information stored in the information register, and that when it is determined that the input data are the last input data that the value thereof is not 0 (zero), then information indicating that the input data are final data is transferred to the variable-length encoding step. This is because compatibility can be achieved even for three-dimensional variable-length encoding, which is used in MPEG-4.

It is also preferable that the encoding method of the present invention further includes a step of controlling a clock supplied to the data buffer, and that based on determination result information stored in the information register, a clock is supplied to the data buffer only during a period of data whose values are not 0 (zero). This is because since clock can be supplied to the data buffer only for the number of data units having a value that is not 0 (zero), it is possible to keep energy consumption down, achieving a reduction in power consumption.

Next, to achieve the above-stated objects, an encoding method according to the present invention is an encoding method in which run-length encoding and variable-length encoding are performed and which comprises a first process step including a step of sequentially inputting one block of m×n data, a step of determining whether a value of each data that is input is 0 (zero), a step of storing determination result information on the results of the determination to a first information register, and a step of storing the input data to a first data buffer, and a second process step including a step of reading the data from the first data buffer based on the determination result information stored in the first information register to create second data, a step of storing the second data to a second data buffer, a step of storing second determination result information on whether the values of the second data are 0 (zero) to a second information register, a step of controlling reading of the second data from the second data buffer based on the second determination result information stored in the second information register, a step of performing run-length encoding using the second data read from the second data buffer and the second determination result information stored in the second information register, and a step of performing variable-length encoding using as a data pair the second input data and the number of consecutive second input data having a value of 0 (zero) obtained in the step of performing run-length encoding. Only the second data having a value that is not 0 (zero) based on the second information register are read from the second data buffer. In the run-length encoding step, an interval in which the second determination result information in the second information register indicates that the value of the second data is not 0 (zero) is transferred to the step of performing variable-length encoding as the number of consecutive second data having a value that is 0 (zero).

With this method, the time for the reading process and the time for the writing process when transferring data between the first process step and the second process step can be shortened, allowing the waiting time of the variable-length encoding process to be shortened. As a result, the speed of the encoding process as a whole can be increased.

Next, to achieve the above-stated objects, an encoding method according to the present invention is an encoding method in which run-length encoding and variable-length encoding are performed, and which includes a step of sequentially inputting one block of m×n data, a step of determining whether a value of each input data is 0 (zero), a step of storing the input data to a data buffer, a step of storing addresses in the data buffer of the data that are determined to have a value that is not 0 (zero) to an address storage portion, a step of reading the data from the data buffer based on the addresses stored in the address storage portion, a step of performing run-length encoding using the data read from the data buffer and the addresses that are stored, and a step of performing variable-length encoding using as a data pair the data and the number of consecutive data having a value of 0 (zero) obtained in the step of performing run-length encoding. Only input data having a value that is not 0 (zero) based on the addresses stored in the storage portion are read from the data buffer, and the difference between the previously read address and the currently read address is transferred to the step of performing variable-length encoding as the number of input data having a value of 0 (zero).

According to this method, addresses only for data having a value that is not 0 (zero) in the data buffer based on the addresses stored in the address storage portion are output. Thus, the waiting time of the variable-length encoding process can be shortened by the amount of time required to read out data having a value that is 0 (zero), allowing the overall speed of the encoding process to be increased.

BRIEF DESCRIPTION OF THE DRAWINGS

FIG. 3 is an explanatory diagram of the input order of the input portion of the encoding device according to the first embodiment of the present invention.

FIG. 4 is an explanatory diagram of the storage order to the information register of the encoding device according to the first embodiment of the present invention.

FIG. 9 is an explanatory diagram of the method of calculating the number of data units having a value of 0 (zero) in the encoding device according to the first embodiment of the present invention.

FIG. 15 is an explanatory diagram of a horizontal priority scan order in the encoding device according to the third embodiment of the present invention.

FIG. 16 is an explanatory diagram of a vertical priority scan order in the encoding device according to the third embodiment of the present invention.

DESCRIPTION OF THE PREFERRED EMBODIMENTS

First Embodiment

Figure 1:
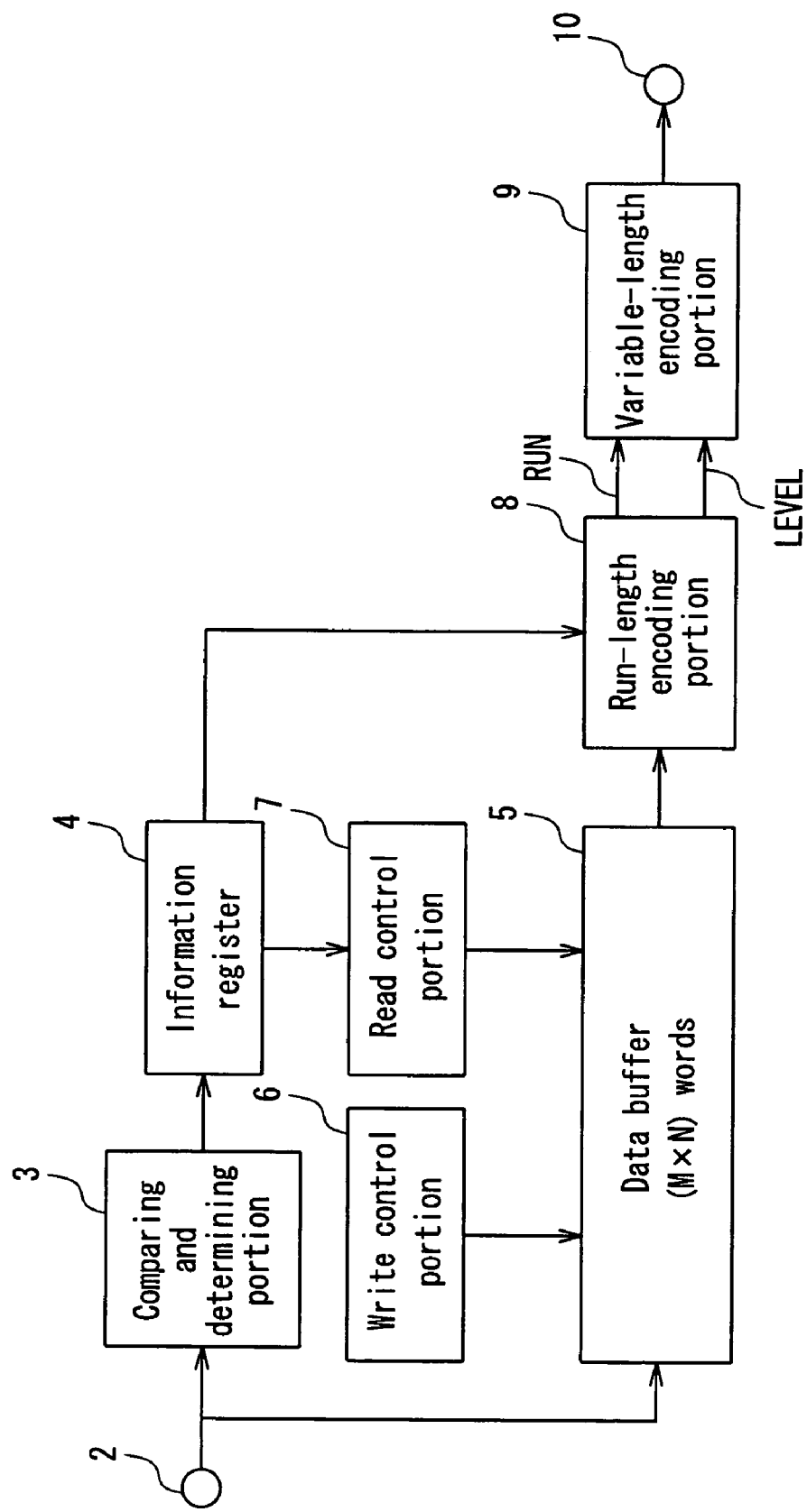
FIG. 1 is a diagram of the configuration of an encoding device according to a first embodiment of the present invention.

An encoding device according to a first embodiment of the present invention is described below with reference to the drawings. FIG. 1 is a diagram showing the configuration of the encoding device according to the first embodiment of the present invention. It should be noted that in the description of the first embodiment, one block of data is assumed to be made of 8×8 data units.

In FIG. 1, the reference numeral 2 denotes an input portion for sequentially inputting the 8×8 data units per block, 3 denotes a comparing and determining portion for determining whether the values of the data input from the input portion 2 are 0 (zero), 4 denotes an information register of 8×8 bits for storing the information on whether the data values are 0 (zero), which is determined by the comparing and determining portion 3, and 5 denotes a data buffer for storing the data input from the input portion 2.

Also, 6 denotes a write control portion for controlling the writing of data to the data buffer 5. 7 denotes a read control portion for controlling the reading of data from the data buffer 5.

Furthermore, 8 denotes a run-length encoding portion for carrying out run-length encoding by counting the number of data units having a value of 0 (zero), based on the data read from the data buffer 5 and the determination information read from the information register 4, and using the number of data units having consecutive values to perform encoding. 9 denotes a variable-length encoding portion for carrying out variable-length encoding using the number of data units having a value of zero that are output from the run-length encoding portion 8 and the data itself as a data pair, and 10 denotes an output portion for outputting encoded data from the variable-length encoding portion 9.

Figure 2:
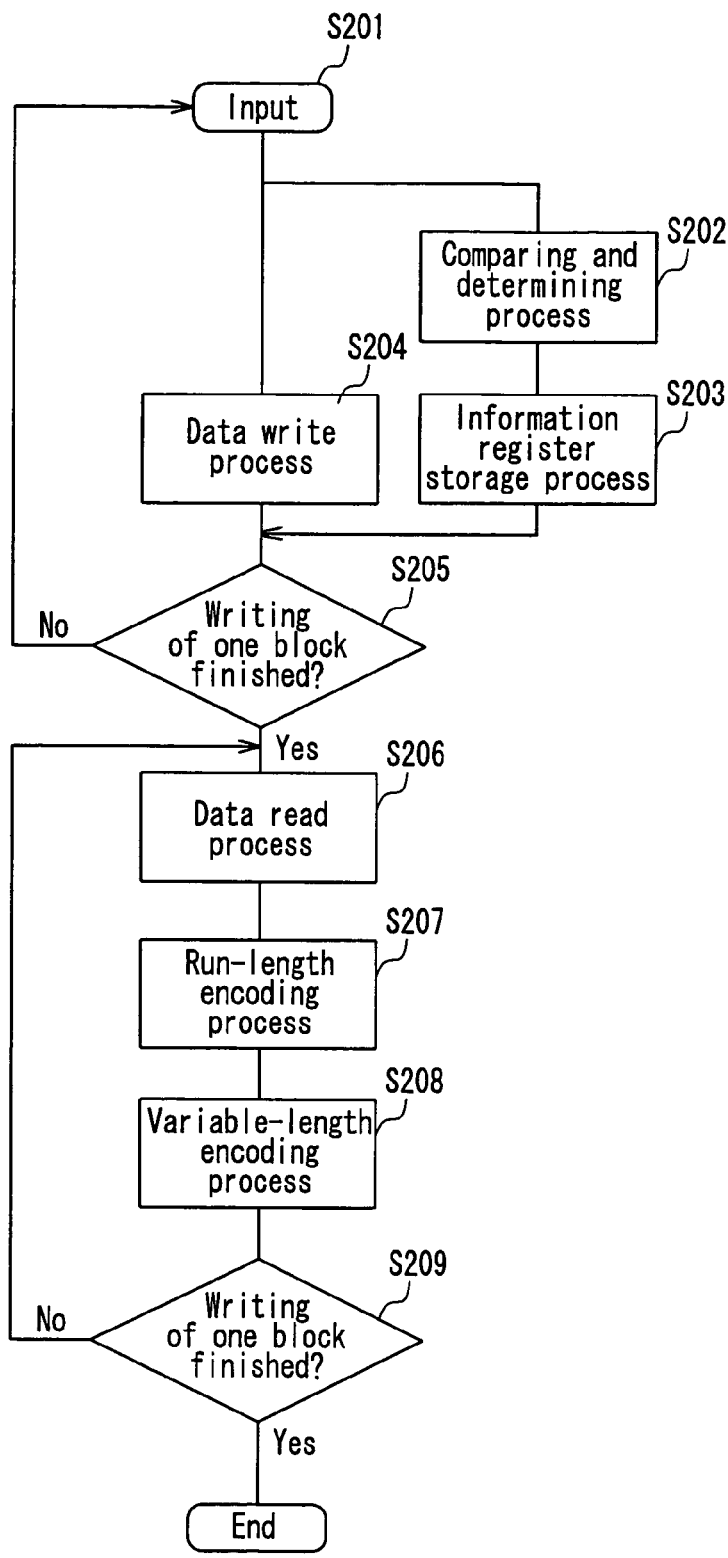
FIG. 2 is a flowchart of the processing of the encoding device according to the first embodiment of the present invention.

FIG. 2 is a flowchart showing the flow of processing by the encoding device according to the first embodiment of the present invention. The flow of processing is described following FIG. 2.

Figures 3, 4:
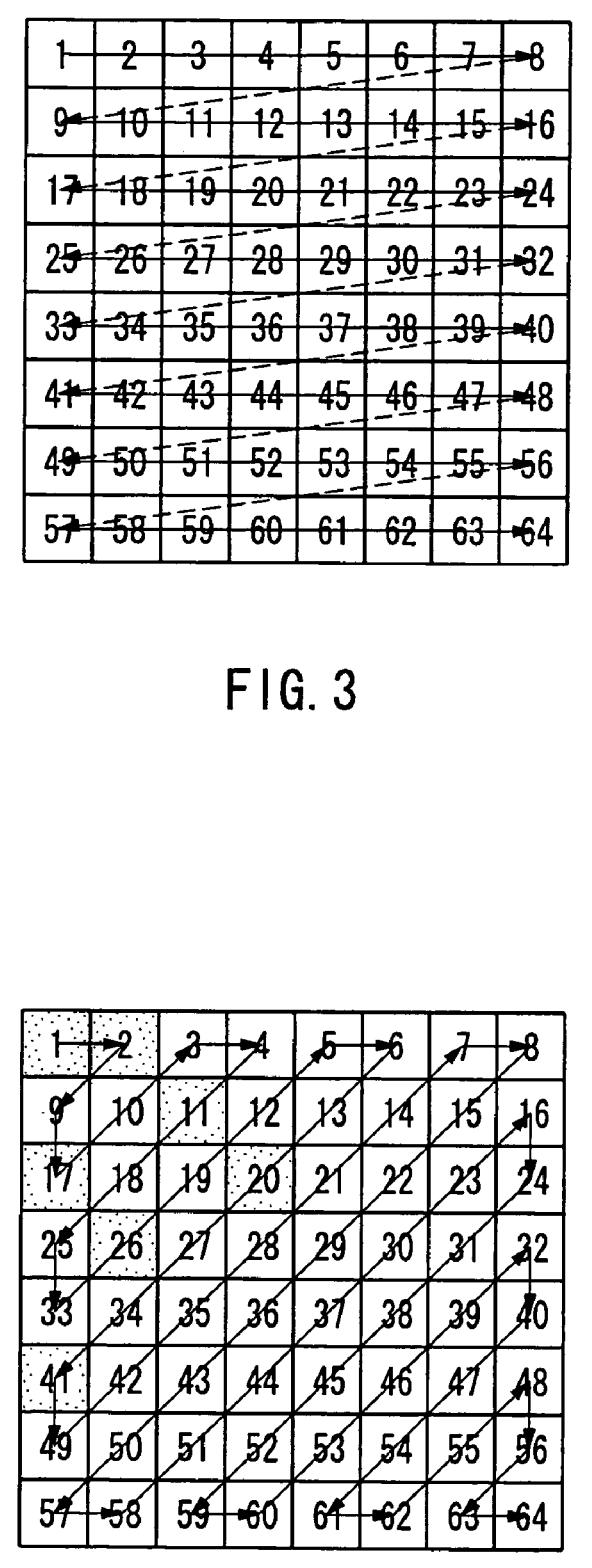

First, one block of 8×8 data is input from the input portion 2 in order from the upper left to the bottom right as shown in FIG. 3 (step S201), and whether the data values are 0 (zero) is determined by the comparing and determining portion 3 (step S202).

The results of the determination by the comparing and determining portion 3 are stored in the information register 4 (step S203). For example, if a data value is 0 (zero), then a '0' is stored, and if it is not 0 (zero), then a '1' is stored.

Figure 5:
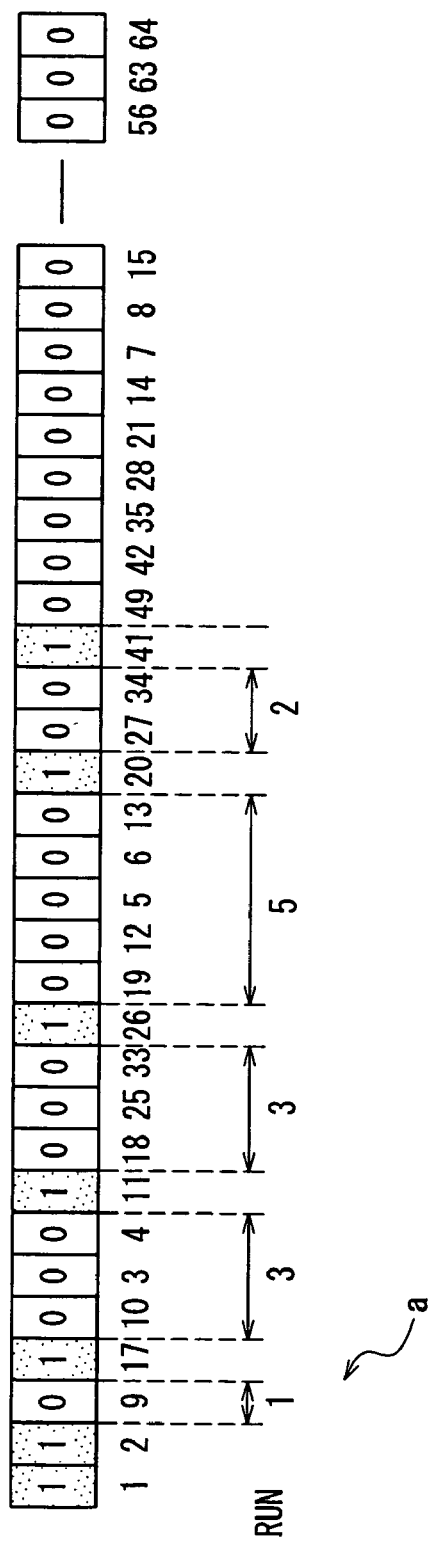
FIG. 5 is a diagram showing an example of the storage record of the information register of the encoding device according to the first embodiment of the present invention.

At this time, one block of data is stored in the information register 4 in the arrangement order shown in FIG. 5 in a zig-zag scan order such as that shown in FIG. 4, that is, the results of the determination for the first data are stored in the first bit, the results of the determination for the second data are stored in the second bit, the results of the determination for the third data area stored in the sixth bit, and so on.

Also, the write control portion 6, at the same time that the data from the input portion 2 are evaluated by the comparing and determining portion 3, sequentially updates the addresses of the data buffer 5, which may be made of a RAM (random access memory), and writes the data itself from the input portion 2 (step S204).

When the input of one block of data from the input portion 2 has finished (step S205: Yes), the read control portion 7, with respect to the data buffer 5, outputs addresses corresponding to the bits in which a '1' is stored in the information register 4 and reads data having a value of not 0 (zero), and shifts the addressees as shown in FIG. 6, so that it reads out only consecutive data whose values are not 0 (zero) (step S206).

Figure 6:
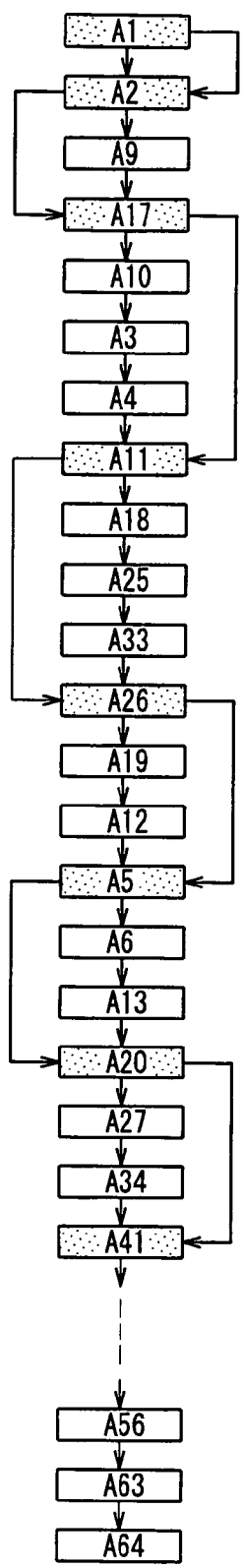
FIG. 6 is a diagram showing an example of shifting the read address in the encoding device according to the first embodiment of the present invention.

That is, as shown in FIG. 6, when Ax is an address corresponding to any position bit x, then to read out data having a value that is not 0 (zero), the addresses are shifted consecutively so that A1→A2→A17→A11 etc.

In the run-length encoding portion 8, the interval between the current bit position in the information register 4 and the bit position in the information register 4 corresponding to the last data read out previously is calculated based on the information stored in the information register 4, and with the length of this interval serving as the number of data units having a value that is 0 (zero), it is output to the variable-length encoding portion 9 together with the data that are from the data buffer 5 (step S207). It should be noted that FIG. 5 shows an example of the record of storage to the information register 4, and for example, when the current bit position in the information register 4 is '17', then the interval between the current bit position of the information register 4 and the bit position of the information register 4 corresponding to the last data that was read out corresponds to an interval a.

The variable-length encoding portion 9 carries out variable-length encoding using the number of data units having a value of 0 (zero), which is output from the run-length encoding portion 8, and the data itself as a data pair, and outputs the encoded data to the output portion 10 (step S208).

Figure 7:
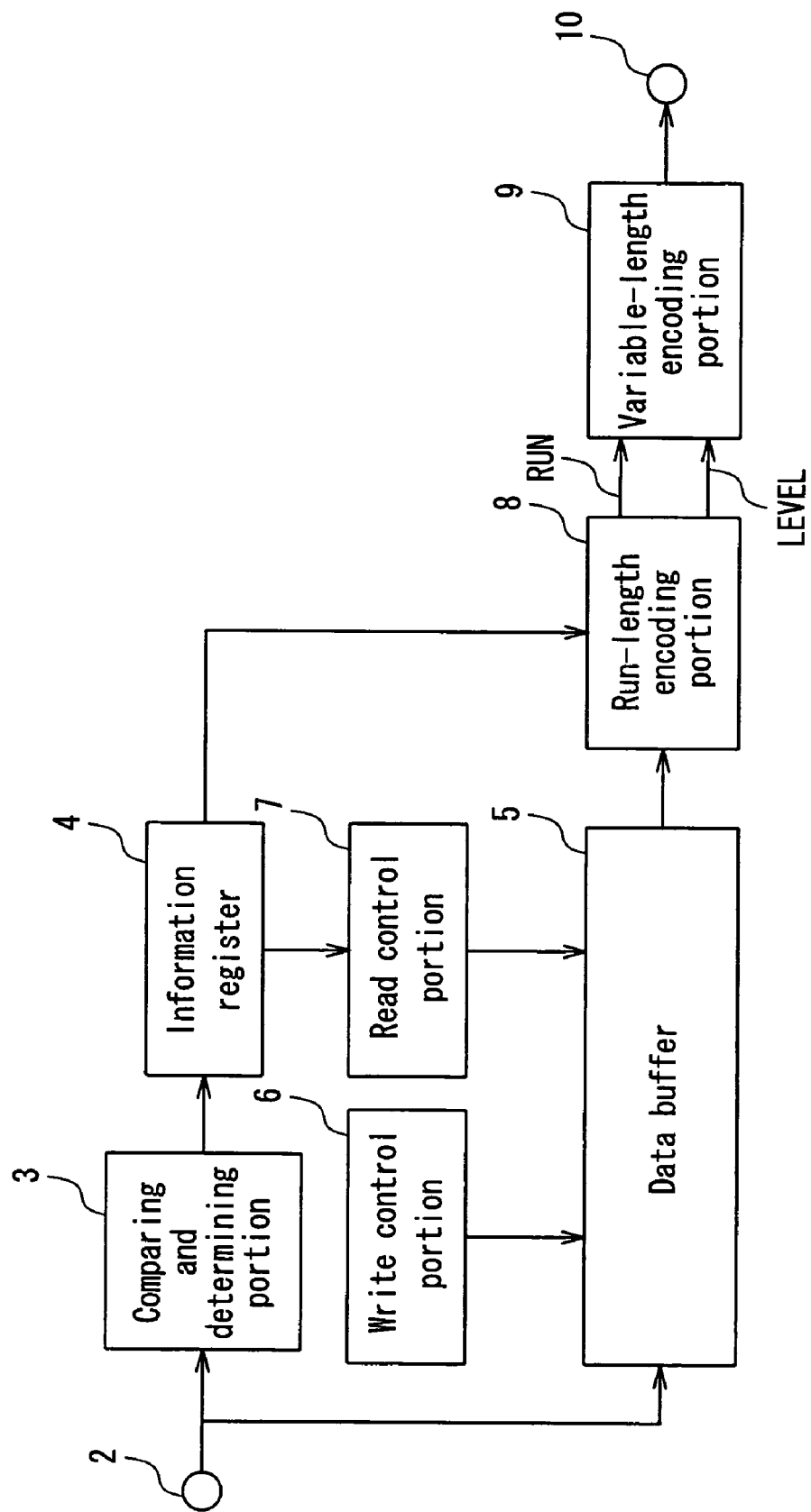
FIG. 7 is a diagram of another configuration of the encoding device according to the first embodiment of the present invention.

A configuration such as that shown in FIG. 7 is also conceivable, in which whether to perform the write process is determined according to the results of the determination by the comparing and determining portion 3. That is, in the case of data that have been determined by the comparing and determining portion 3 to have a value of 0 (zero), it is possible for the write control portion 6 not to update the addresses of the data buffer 5 and not to perform the write process.

Figure 8:
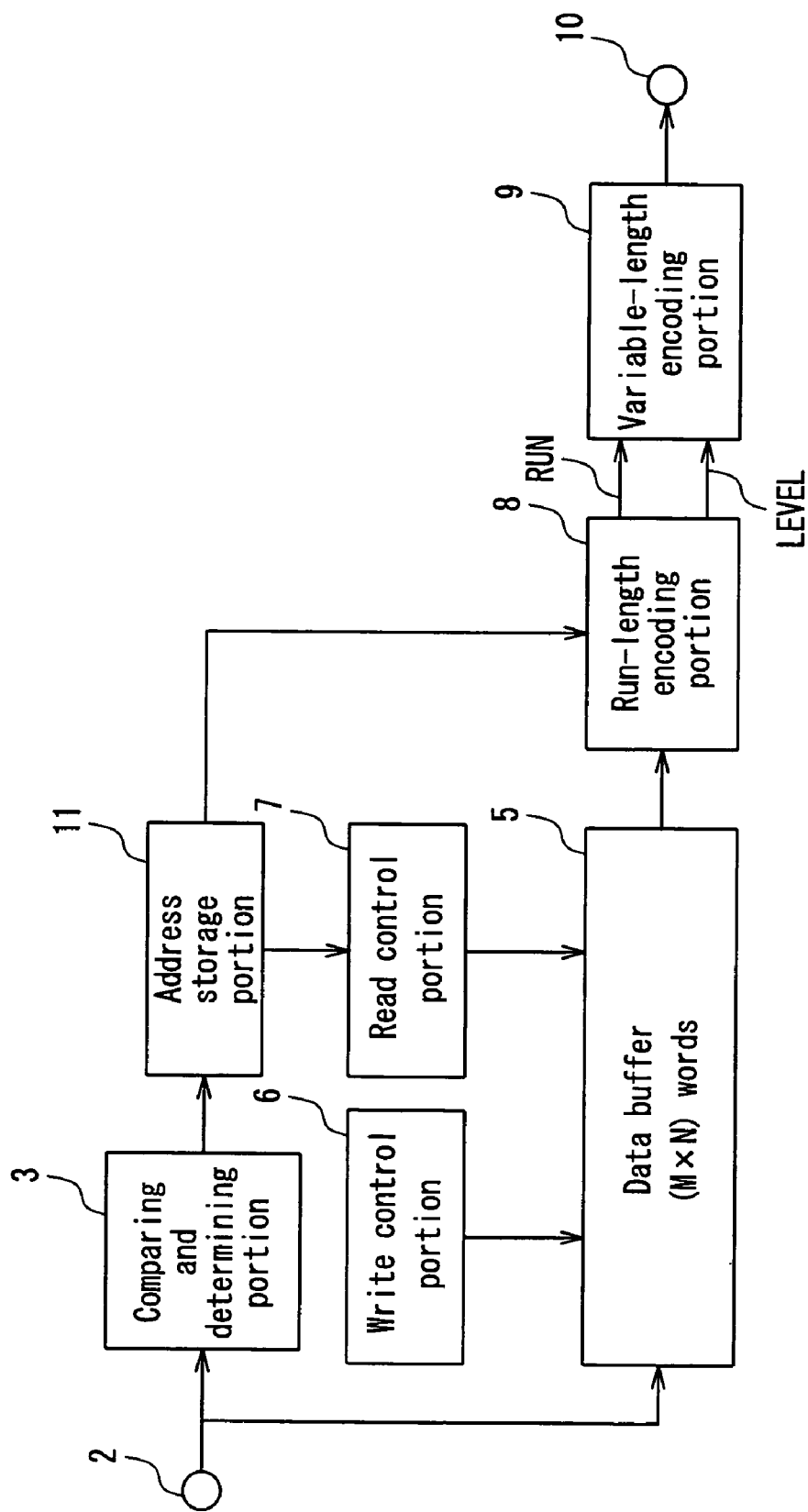
FIG. 8 is a diagram of another configuration of the encoding device according to the first embodiment of the present invention.

Another conceivable configuration is that shown in FIG. 8, in which an address storage portion 11 is used in place of the information register 4. In this case, the addresses of the data buffer 5, to which data determined by the comparing and determining portion 3 not to have the value of 0 (zero) are written, are stored in the address storage portion 11.

Then the read control portion 7 outputs only the addresses stored in the address storage portion 11, performing control so that only data other than data having a value of 0 (zero) are read. The run-length encoding portion 8 calculates the number of data units having a value of 0 (zero) in a zig-zag scan order such as that shown in FIG. 9 based on the previously read address and the currently read address. That is, '0' data are calculated between addresses 1 and 2, '1' data are calculated between addresses 2 and 17, '3' data are calculated between addresses 17 and 11, '3' data are calculated between addresses 11 and 26, and so on.

Figure 10:
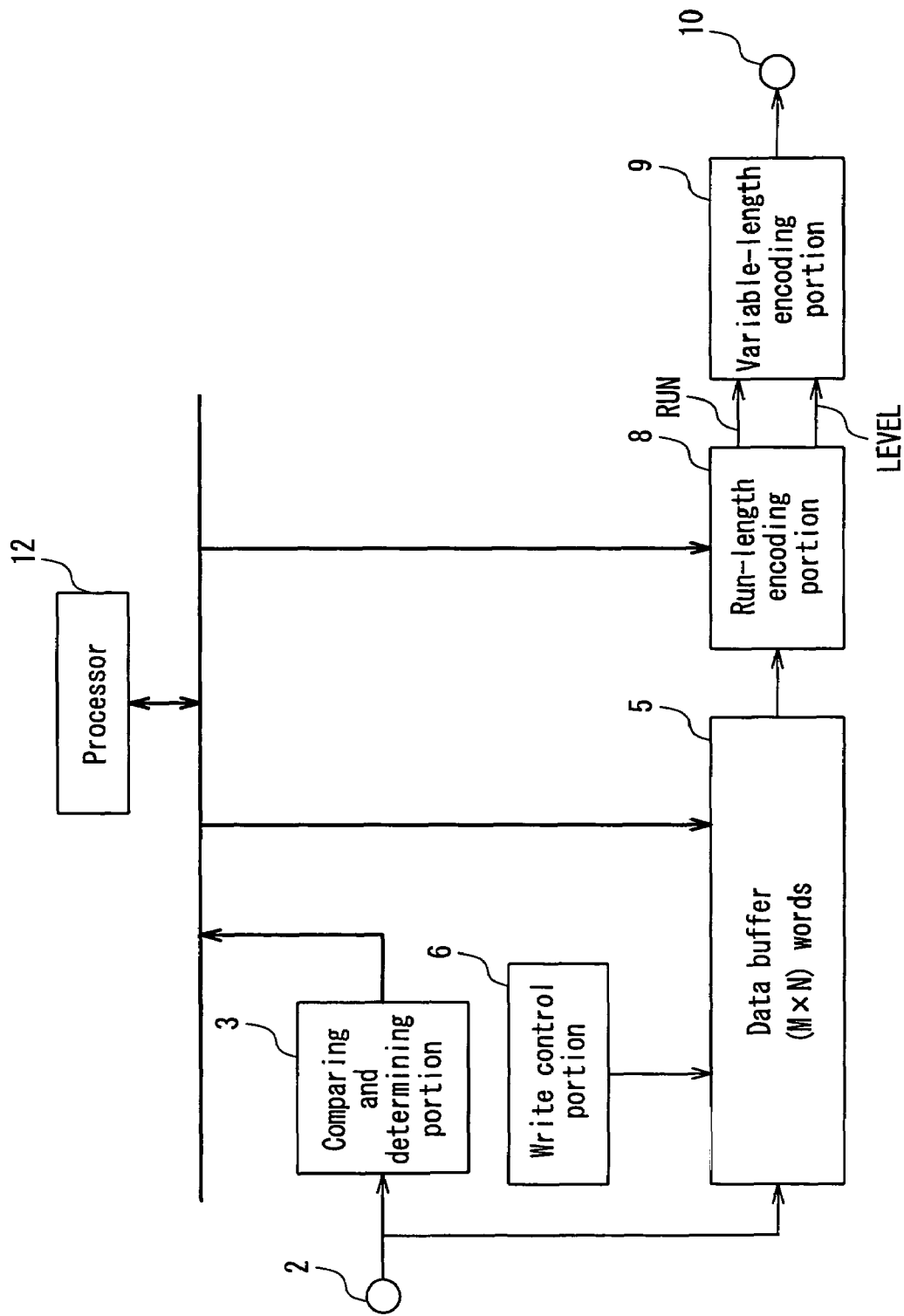
FIG. 10 is a diagram of another configuration of the encoding device according to the first embodiment of the present invention.

Another conceivable configuration is shown in FIG. 10, in which a processor 12 stores the addresses of the data buffer 5 to which data determined by the comparing and determining portion 3 not to have a value of 0 (zero) are written. In this case, since the processor 12 stores the addresses for reading out the data, outputting addresses directly to the data buffer 5 allows data having a value that is not 0 (zero) to be read out.

Also, since the processor 12 stores the addresses for reading out the data, the processor 12 can calculate the number of consecutive data whose values are 0 (zero) in a zig-zag scan order such as that shown in FIG. 9 and output the result to the run-length encoding portion 8.

By adopting the above configuration, the read control portion 7 can output addresses only for the data whose value is not 0 (zero) based on the information stored in the information register 4. As a result, since the amount of time to access the data buffer 5 is shortened by the amount of time required to read out the data having a value of 0 (zero), the processing time up to the variable-length encoding process can be shortened, allowing the overall encoding process to the made faster.

Also, the run-length encoding portion 8, by calculating, based on the information stored in the information register 4, the interval between the current bit position in the information register 4 and the bit position in the information register 4 corresponding to the data having a value that is not 0 (zero) that was last read out, can compute the number of consecutive data having a value of 0 (zero) at the current bit position, and thus a means for counting the run-length is not necessary.

Further, since only data determined by the comparing and determining portion 3 to have a value of 0 (zero) can be written to the data buffer 5 by the write control portion 6, the amount of data that are written and transferred can be reduced, allowing more efficient use of the data buffer 5.

Also, if the processor 12 stores the addresses, then the addresses used for reading out data having a value that is not 0 (zero) can be output directly to the data buffer 5, obviating the need for means for storing addresses, and this allows a reduction in the hardware configuration to be achieved.

Second Embodiment

An encoding device according to a second embodiment of the present invention is described below with reference to the drawings. It should be noted that structural components similar to those of the first embodiment have been assigned identical reference numerals, and thus detailed description thereof is omitted. The second embodiment is also described using a case where one block is assumed to be made of 8×8 data units.

Figure 11:
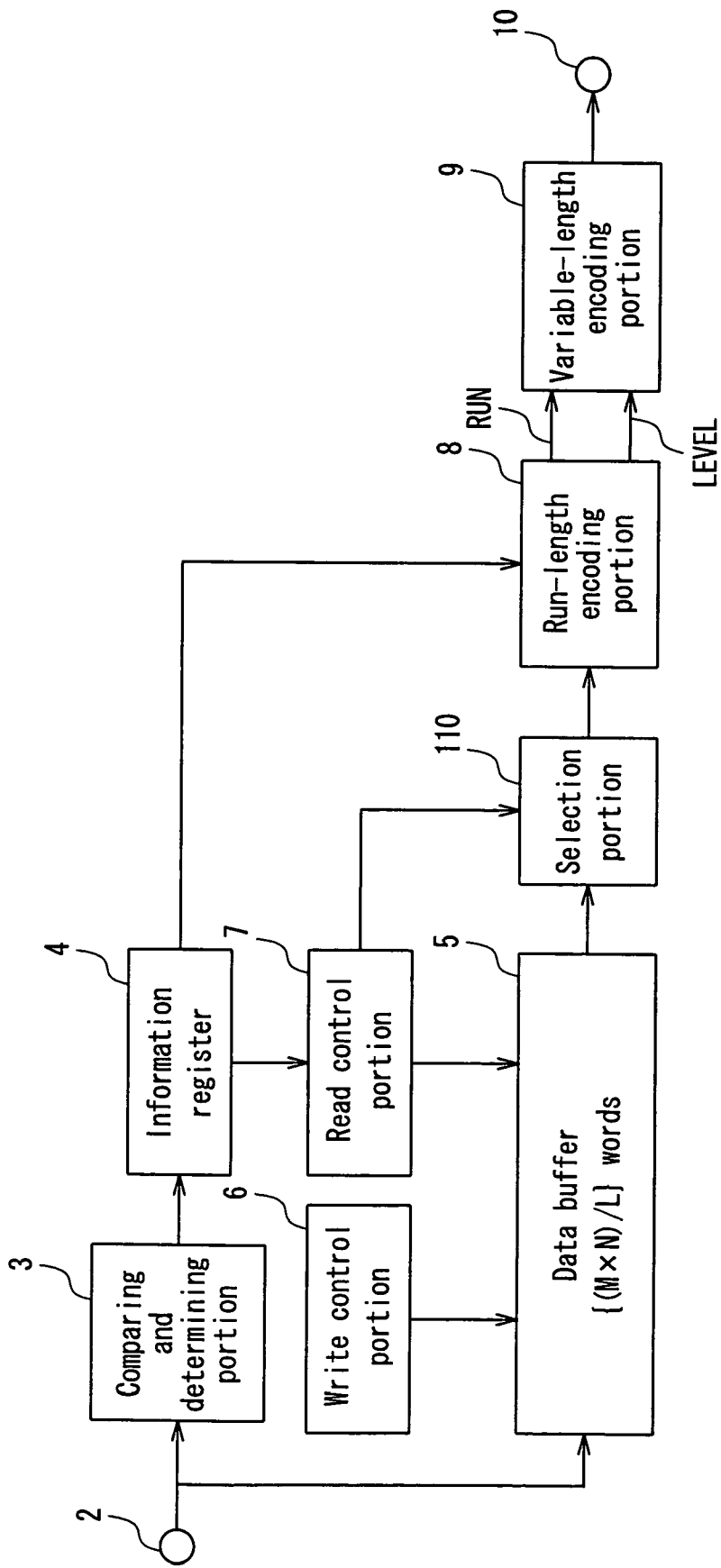
FIG. 11 is a diagram of a configuration of an encoding device according to a second embodiment of the present invention.

FIG. 11 is a schematic view of the configuration of an encoding device 101 according to a second embodiment of the present invention. In FIG. 11, compared to the encoding device according to the first embodiment, the second embodiment is characterized in that the data buffer 5 is capable of storing two, for example, data units input from the input portion 2 per address, and in that a selection portion 110 for selecting the data output from the data buffer 5 is provided. The input portion 2, the comparing and determining portion 3, and the information register 4 have the same operations as those in the first embodiment.

Figures 12A, 12B:
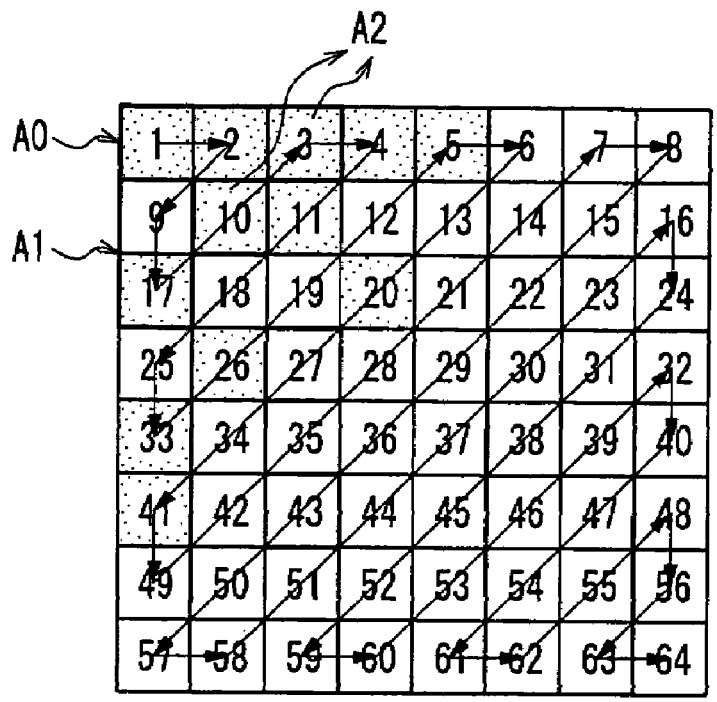
FIG. 12 is a diagram illustrating an example of the method of obtaining data and the configuration of the data buffer in the encoding device according to the second embodiment of the present invention.

In FIG. 11, the write control portion 6, at the same time that the data input from the input portion 2 are evaluated by the comparing and determining portion 3, outputs addresses to the data buffer 5 so as to store two data per address in a zig-zag scan order, as shown in FIG. 12A. That is, the first and the second data are written to address A0, the ninth and the seventeenth data are written to address A1, the tenth and the third data are written to address A2, and so on. In other words, as shown in FIG. 12B, two data are saved per address. As for the method for storing data to a single address, in the order of the zig-zag scan, the data earlier in the order is stored on the upstream side and the data later in the order is stored on the downstream side.

Figure 13:
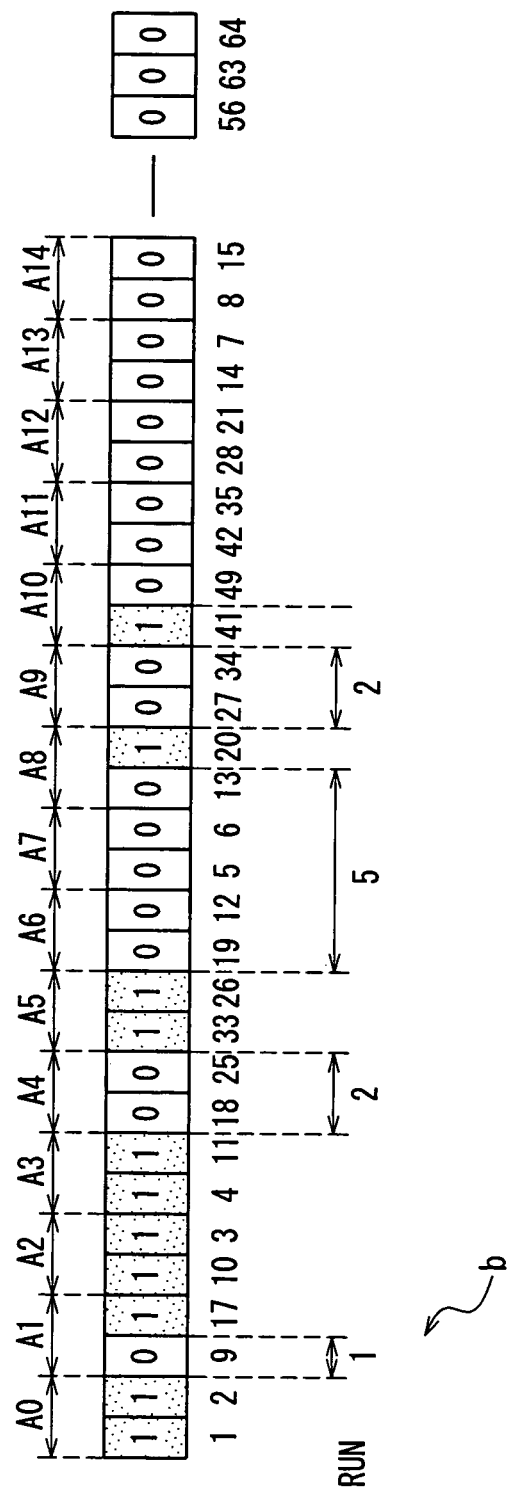
FIG. 13 is a diagram showing an example of a storage record of the information register of the encoding device according to the second embodiment of the present invention.

When the input of one block of data from the input portion 2 is finished, the read control portion 7 simultaneously evaluates the bit information in the information register 4 corresponding to the addresses of the data buffer 5, that is, the two bits corresponding to each address shown in FIG. 13, and if one or both of the values are not 0 (zero), then it outputs the address corresponding to the current bit position in the information register 4 to the data buffer 5.

In the read control portion 7, two bits of the information register 4 indicating which values of the read data are not zero (0) are output to the selection portion 110, and the selection portion 110 outputs the upstream data read from the data buffer 5 if the upstream bit of the two bits is '1' and outputs the downstream data read from the data buffer 5 if the downstream bit of the two bits is '1'. If both of the two bits of the information register 4 are '1', then the selection portion 110 outputs the upstream and the downstream data, in that order, that are read from the data buffer 5.

Then, the run-length encoding portion 8, at the same time that the read control portion 7 reads data from the addresses of the data buffer 5 based on the information stored in the information register 4, calculates the interval b between the current bit position in the information register 4 and the bit position in the information register 4 corresponding to the data that was last read out, as shown in FIG. 13, if either the upstream or the downstream data that have been read has a value that is not 0 (zero), and calculates this as the number of data units having a value of 0 (zero).

If both the upstream and the downstream data that have been read out have a value that is not 0 (zero) based on the information stored in the information register 4, then as the number of 0s (zeros) forming pairs with the upstream data, the interval between the current bit position in the information register 4 and the bit position in the information register corresponding to the data that last was read out, that is, b in FIG. 13, is output, and as the number of data units having a value of 0 (zero) forming pairs with the downstream data, a '0' is output in order to express that data whose values are not 0 (zero) are consecutive.

Thereafter, the variable-length encoding portion 9 operates in the same manner as in the first embodiment.

As described above, in the data buffer 5, a plurality of data are stored correlated in a single address, and by the read control portion 7 determining whether the information stored in the information register 4 has a value of 0 (zero) in units of a plurality of bits, it is possible to determine simultaneously whether data having a value that is not 0 (zero) are consecutive, and if data having a value of 0 (zero) are consecutive, then the time for accessing the data buffer 5 can be shortened by that amount, and therefore the time up to the execution of the variable-length encoding process can be shortened, allowing the encoding process to be made faster.

It should be noted that although the second embodiment was described with respect to a case in which two data are stored per address in the buffer memory 5, there is no particular limitation to this, and it is also possible to store two or more data per address.

Third Embodiment

An encoding device according to a third embodiment of the present invention is described below with reference to the drawings. It should be noted that structural components similar to those of the first embodiment have been assigned identical reference numerals, and thus detailed description thereof is omitted. The third embodiment is also described using a case where one block is assumed to be made of 8×8 data units.

Figure 14:
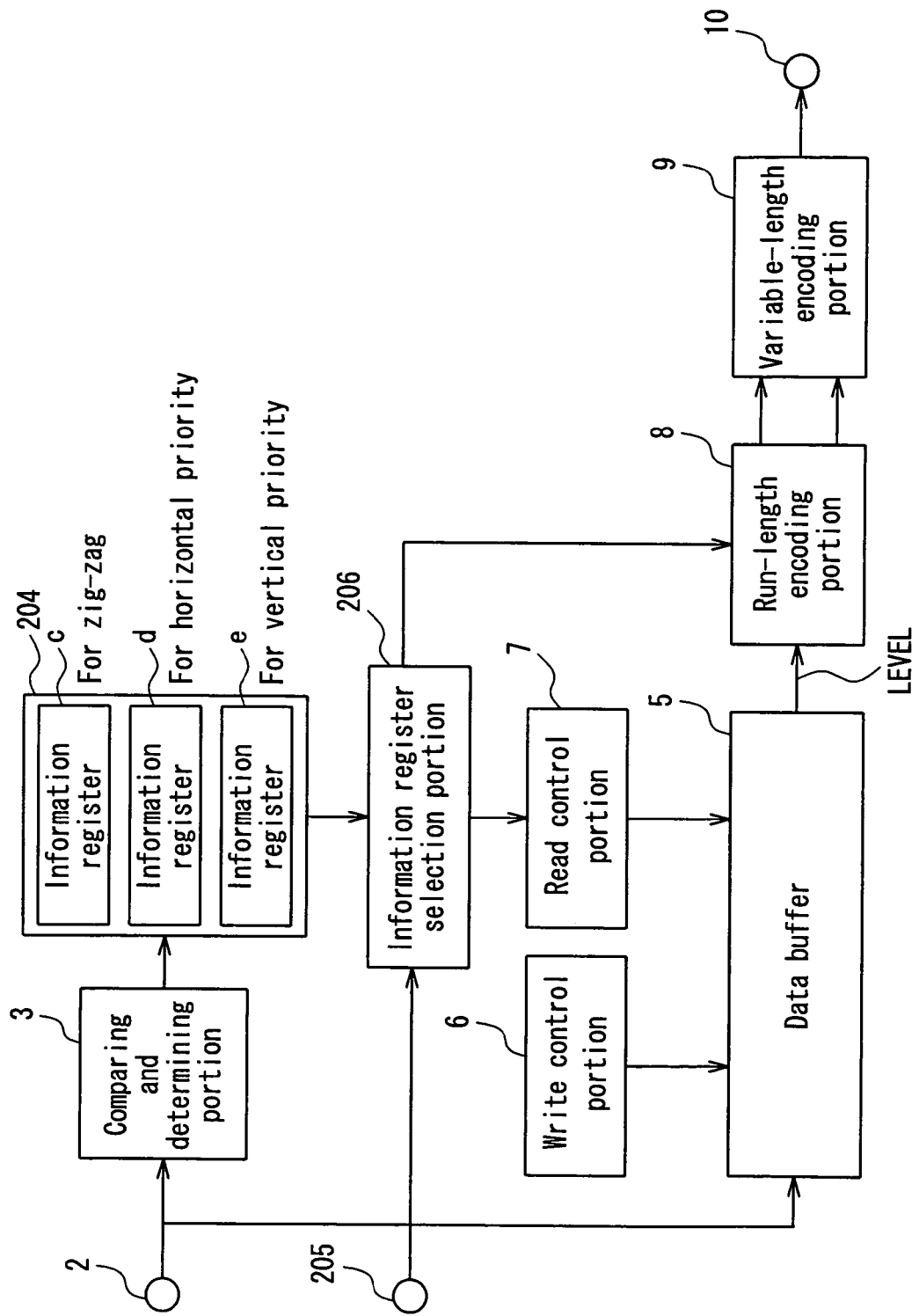
FIG. 14 is a diagram of a configuration of an encoding device according to a third embodiment of the present invention.

FIG. 14 schematically shows the encoding device according to the third embodiment of the present invention. As is clear from FIG. 14, compared to the first embodiment, the encoding device of the third embodiment is characterized in that it is provided with an information register group 204 having at least one information register of 8×8 bits for storing in different arrangement orders the results of the determination by the comparing and determining portion 3 of whether the data have values of 0 (zero), a second input portion 205 for inputting information indicating the characteristics of the block to be encoded that is input from the input portion 2, and an information register selection portion 206 for selecting one information register from the information register group 204 based on the information indicating the characteristics of the block to be encoded that is input by the second input portion 205. It should be noted that the input portion 2, the comparing and determining portion 3, and the data buffer 5 have the same operations as those in the first embodiment.

In FIG. 14, the second input portion 205 inputs the results of AC/DC prediction, which is the spatial prediction encoding of MPEG-4, for example.

Then, a suitable information register is selected by the selection portion 206 based on the results of the AC/DC prediction that are input, thereby selecting the order of the scan used during variable-length encoding of the block to be encoded. In the example of FIG. 14, if the information register c is selected, then a zig-zag scan such as that shown in FIG. 4 is selected, if the information register d is selected, then the horizontal priority scan shown in FIG. 15 is selected, and if the information register e is selected, then the vertical priority scan shown in FIG. 16 is selected.

One block of data is stored in the information register c of the information register group 204 as a record such as that shown in FIG. 5 in the zig-zag scan order shown in FIG. 4, in which the results of the determination for the first data are stored in the first bit, the results of the determination for the second data are stored in the second bit, and the results of the determination for the third data are stored in the sixth bit.

Figures 15, 16:
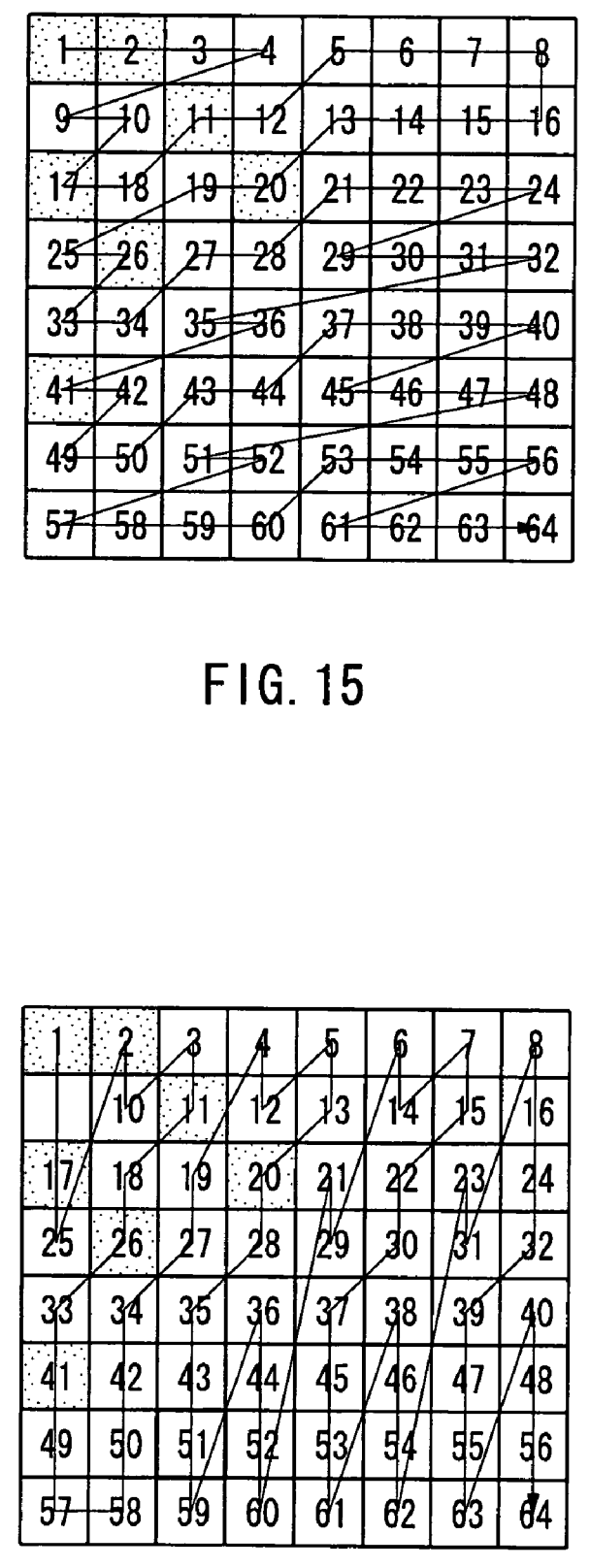
Figure 17:
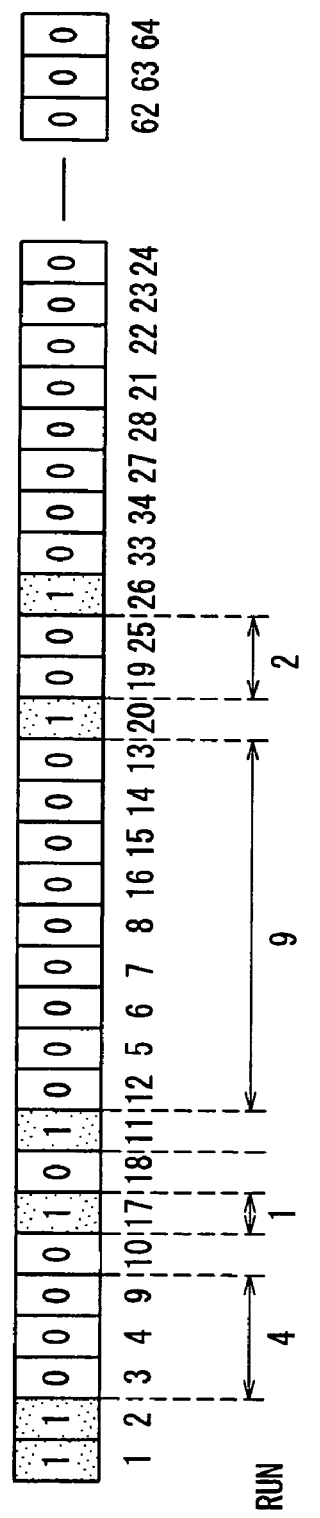
FIG. 17 is a diagram showing an example of the storage record of the information register when a horizontal priority scan order is adopted in the encoding device according to the third embodiment.

To the information register d, one block of data is stored as a record such as that shown in FIG. 17 in the horizontal priority scan order used in MPEG-4 and shown in FIG. 15, in which the results of the determination for the first data are stored in the first bit, the results of the determination for the second data are stored in the second bit, and the results of the determination for the third data are stored in the third bit.

Figure 18:
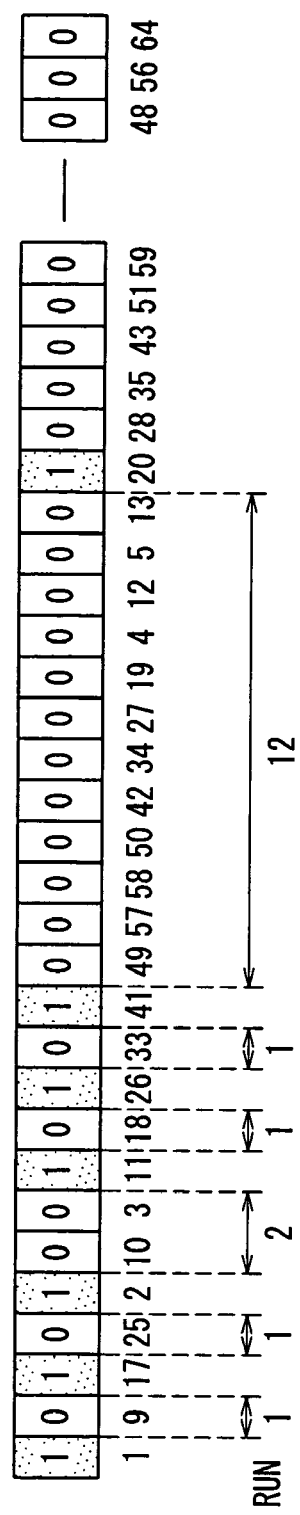
FIG. 18 is a diagram showing an example of the storage record of the information register when a vertical priority scan order is adopted in the encoding device according to the third embodiment.

To the information register e, one block of data is stored as a record such as that shown in FIG. 18 in a vertical priority scan order, which is used in MPEG-4, as shown in FIG. 16, in which the results of the determination for the first data are stored in the first bit, the results of the determination for the second data are stored in the ninth bit, and the results of the determination for the third data are stored in the seventeenth bit.

The information register selection portion 206 then selects one of the information registers of the information register group 204 based on the results of AC/DC prediction that are input from the second input portion 205, and outputs the information stored in the selected information register to the read control portion 7.

Thereafter, the read control portion 7, the run-length encoding portion 8, and the variable-length encoding portion 9 operate in the same manner as in the first embodiment.

As described above, by preparing information registers having a plurality of order arrangements in the information register group 204 and allowing the information registers to be selected based on information that is input from the second input portion 205, it is possible to make encoding faster even in the case of variable-length encoding such as MPEG-4.

It should be noted that the third embodiment has been described using as an example a case in which the results of AC/DC prediction of MPEG-4 serve as a second input, but there is no particular limitation to this, and it is also possible to select information registers based on other information.

Also, in the third embodiment, a case in which one of the information registers, which have different storage orders achieved through three different types of scanning, is described, but there is no particular limitation to this configuration, and it is also possible to prepare information registers having storage orders achieved through other types of scanning.

Fourth Embodiment

An encoding device according to a fourth embodiment of the present invention is described below with reference to the drawings. It should be noted that structural components similar to those of the first embodiment have been assigned identical reference numerals, and thus detailed description thereof is omitted. The fourth embodiment is also described using a case where one block is assumed to be made of 8×8 data units.

Compared to the first embodiment, the fourth embodiment is characterized in that the encoding device has a plurality of process chains from the storage of information on whether the data input to the information register have values of 0 (zero) to the reading of data from the data buffer. A case in which there are two such process chains is used as an example in the following description.

Figure 19:
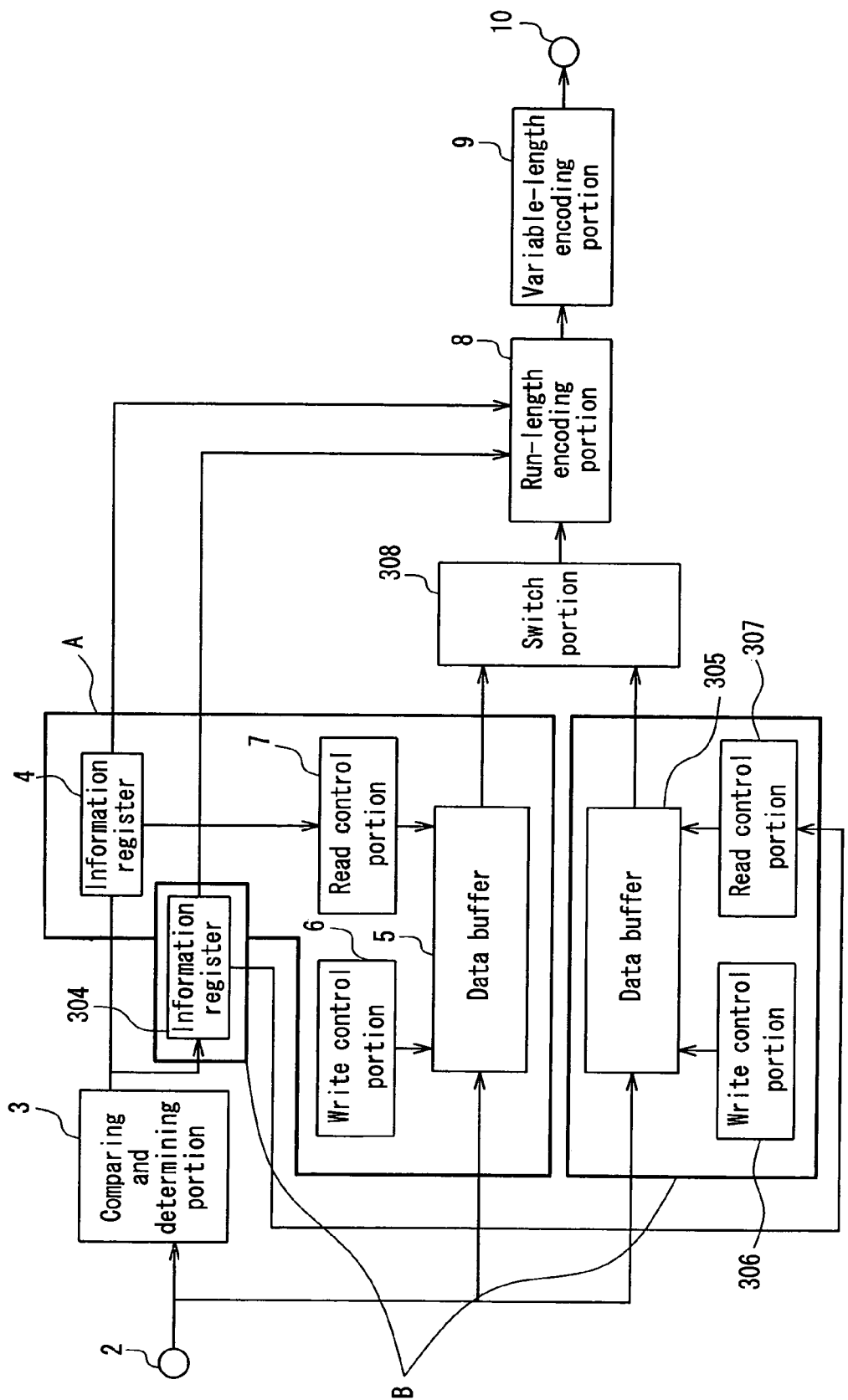
FIG. 19 is a diagram of a configuration of an encoding device according to a fourth embodiment of the present invention.

FIG. 19 is a diagram that schematically shows the encoding device according to the fourth embodiment of the present invention. The encoding device of FIG. 19 has been additionally provided with an information register 304 of 8×8 bits for storing information on whether the data that have been input have a value of 0 (zero) based on the results of the determination by the comparing and determining portion 3, a data buffer 305 for storing data input from the input portion 2, a write control portion 306 for controlling writing to the data buffer 305, a read control portion 307 for controlling reading from the data buffer 305, and a switch portion 308 for switching between the data from the data buffer 5 and the data from the data buffer 305 and outputting that data.

First, in FIG. 19, process A is a series of processes using the information register 4, the data buffer 5, the write control portion 6, and the read control portion 7, which operate in the same manner as in the first embodiment, and process B is a series of processes using the information register 304, the data buffer 305, the write control portion 306, and the read control portion 307, which operate in the same manner as in the first embodiment.

A block of 8×8 data units that is input from the input portion 2 is evaluated by the comparing and determining portion 3, and written to the data buffer 5 through process A. Next, when the input of one block of inputted data from the second input portion 2 is over, then it is read out from the data buffer 5 through process A and output from the switch portion 308. Concurrent with the start of this reading through process A, the next block of data is sequentially input from the input portion 2, evaluated in the comparing and determining portion 3, and written to the data buffer 305 through process B.

When the input of the one block of data that was additionally input from the input portion 2 is over, then that data are read out from the data buffer 305 through process B and output from the switch portion 308. Concurrent with the start of this reading through process B, the next block of data is sequentially input from the input portion 2, evaluated in the comparing and determining portion 3, and written to the data buffer 5 through process A. In this way, encoding is carried out in alternation while process A and process B are performed. It should be noted that the run-length encoding portion 8 and the variable-length encoding portion 9 operate in the same manner as in the first embodiment.

Thus, by providing a plurality of process chains from the storage of information on whether the data input to the same information register as in the first embodiment has a value of 0 (zero) to the reading of data from the data buffer, the writing and reading of data to and from the data buffers can be carried out simultaneously and in parallel to one another, allowing the encoding process to be carried out without waiting by the amount of time required to read the data buffer, and thus the speed of the overall encoding process can be increased by that amount of time.

It should be noted that the fourth embodiment was described using as an example a configuration in which a write control portion and a read control portion are provided for each data buffer, but it is also possible to adopt a configuration in which both data buffers are controlled by a single write control portion and single a read control portion.

Fifth Embodiment

An encoding device according to a fifth embodiment of the present invention is described below with reference to the drawings. It should be noted that structural components similar to those of the first embodiment have been assigned identical reference numerals, and thus detailed description thereof is omitted. The fifth embodiment as is also described using a case where, in encoding such as JPEG, one block is assumed to be made of 8×8 data units.

Figure 20:
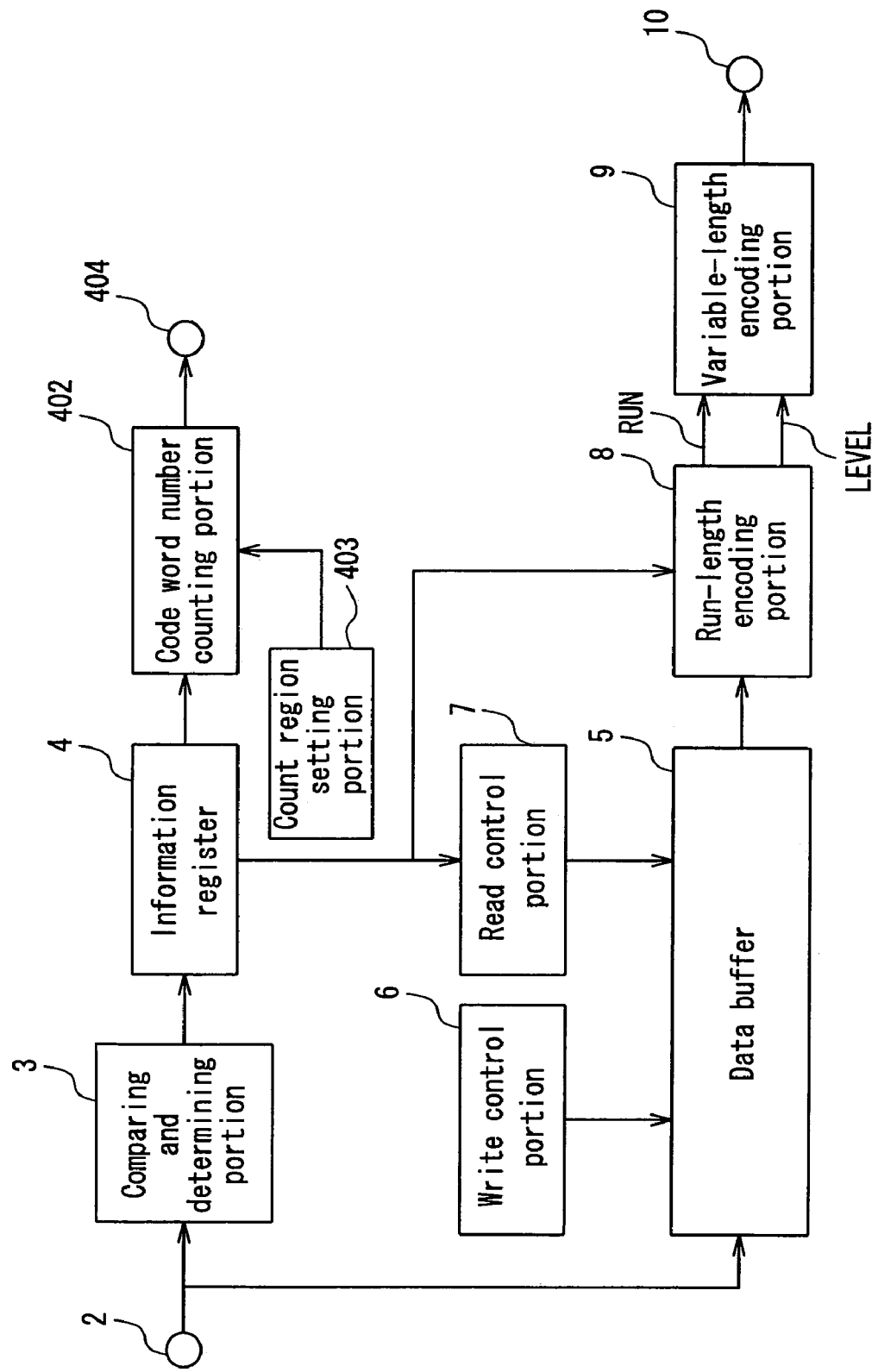
FIG. 20 is a diagram of a configuration of an encoding device according to a fifth embodiment of the present invention.

FIG. 20 schematically shows the encoding device according to the fifth embodiment of the present invention. Compared to the first embodiment, the fifth embodiment is characterized in the provision of a code word number counting portion 402 for counting the number of data units in the information register 4 having a value that is not 0 (zero), a region setting portion 403 for setting a region within a block that is counted by the code word number counting portion 402, and an output portion 404 for outputting the value counted by the code word number counting portion 402.

Figure 21:
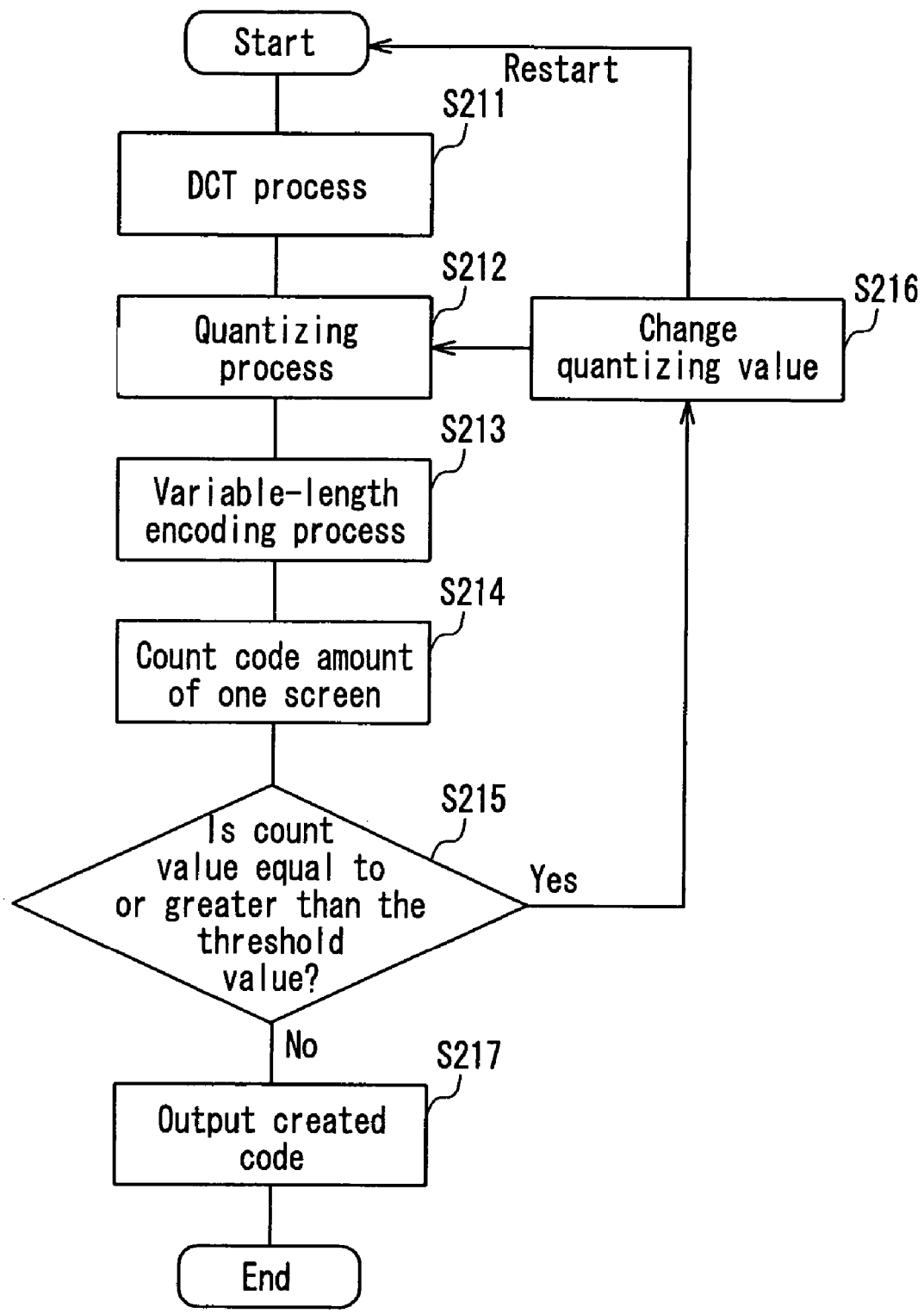
FIG. 21 is a flowchart of conventional code data amount control.

With encoding technologies such as JPEG, to control the amount of data that is encoded, conventionally, as shown in the process flow chart of FIG. 21, a DCT process (step S211) and a quantizing process (step 212) are performed, encoding is carried out through variable-length encoding (step S213), the amount of code for a single picture that is created is calculated (step S214), and whether the count value of the code amount is within an appropriate range is determined by comparing it with a predetermined threshold value (step S215).

That is, if the count value of the code amount of a single picture exceeds a predetermined threshold value that has been set (step S215: Yes), then to increase the coefficients having a value of 0 (zero) so that the code amount can be reduced, the quantizing value that is used for division in the quantizing process is changed (step S216), and the encoding process is performed again. If the count value of the code amount of a single picture is equal to or less than the predetermined threshold value that has been set (step S215: No), then the generated code is output (step S217).

Thus, in conventional encoding technologies, to control the amount of data that is encoded, it was necessary to change the quantizing value and carry out encoding again after the encoding process was already completed one time.

Generally, in variable-length encoding, code words are allocated to data having a value that is not 0 (zero), and thus the number of code words increases with more data having a value that is not 0 (zero). Accordingly, in the fifth embodiment, the number whose value is '1' in the information register 4 are counted so that whether the amount of code data is appropriate can be determined without completing the encoding process.

Figure 22:
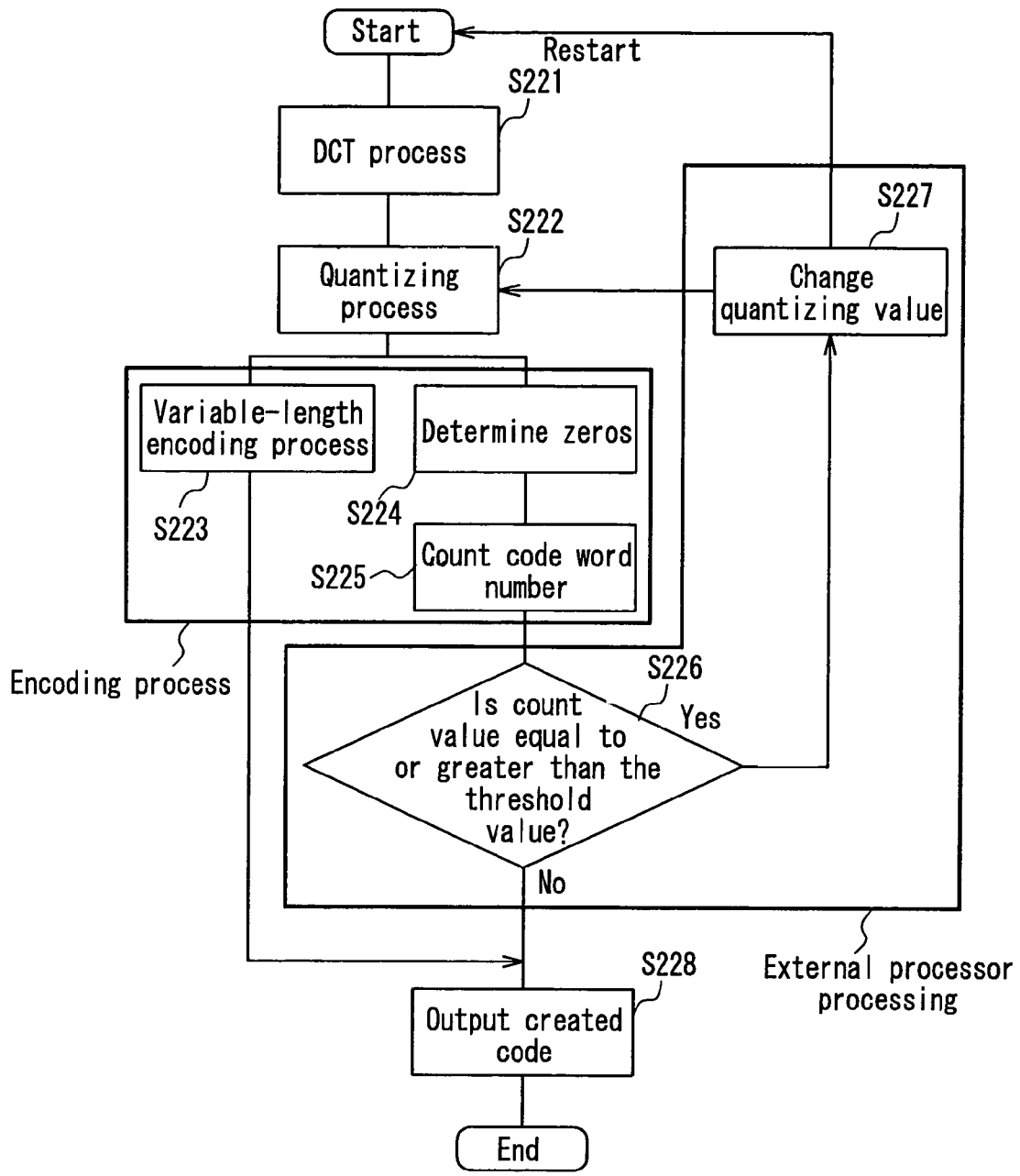
FIG. 22 is a flowchart of code data amount control in the encoding device according to the fifth embodiment of the present invention.

A flowchart of the process of the encoding device according the fifth embodiment is shown in FIG. 22. In FIG. 22, DCT processing (step S221) and quantizing (step S222) are performed with respect to the data that are input, and at the same time that variable-length encoding is performed (step S223), whether the values that are stored in the information register 4 are 0 (zero) is determined by the code word number counting portion 402 (step S224) and the number of data units having a value of '1' is counted (step S225).

The picture quality of the data in the high-frequency region is comparatively not affected when counting using the code word number counting portion 402, and thus it is preferable that the region setting portion 403 sets a region in the high-frequency region. This is because doing so allows the quantizing value to be changed so that the designated region includes many data having a value of 0 (zero) without affecting the picture quality, making it possible to reduce the amount of code.

Figure 23:
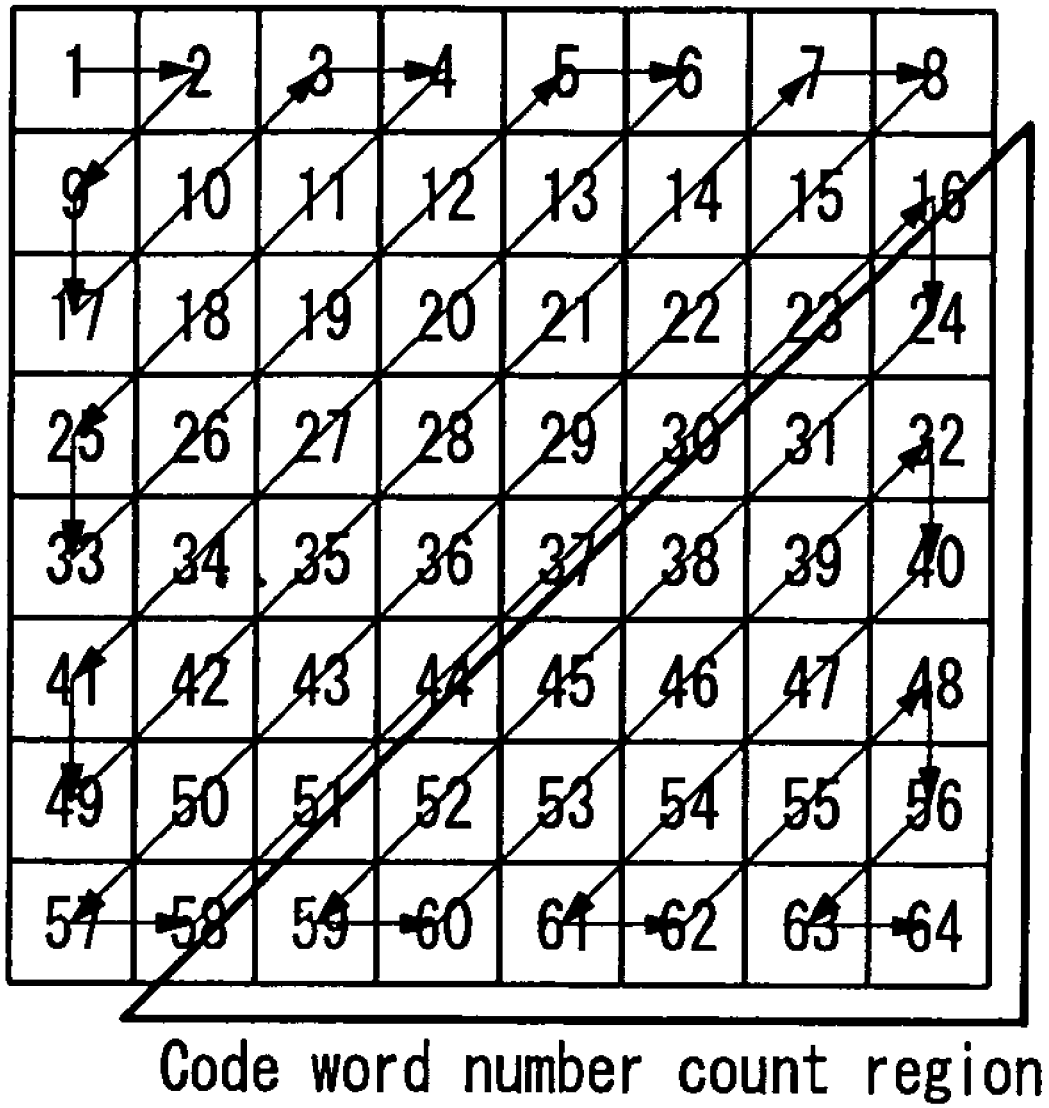
FIG. 23 is a diagram showing an example of the count region setting in the encoding device according to the fifth embodiment of the present invention.

Accordingly, in the region setting portion 403, as shown in FIG. 23, for example, the high-frequency region in one block is set as the code word number count region, and the code word number counting portion 402 counts the number of data units in the information region 4 having a value of '1', which correspond to the data within the region set by the region setting portion 403, as one picture, and this is output from the output portion 404.

Then, the counted value that is output from the output portion 404 is compared with a predetermined threshold value using an external processor, for example (step S226), and if it is greater than the predetermined threshold value (step S226: Yes), then it is determined that the amount of data that has been encoded is too large, and the quantizing value is changed before variable-length encoding is finished in the variable-length encoding portion 9 (step S227) and the variable-length encoding process is performed once again.

If the counted value that is output from the output portion 404 is less than or equal to the predetermined threshold value (step S226: No), then it is determined that the amount of data that has been encoded is appropriate and the variable-length encoding process is continued by the variable-length encoding portion 9 to generate code words (step S228).

Figure 24:
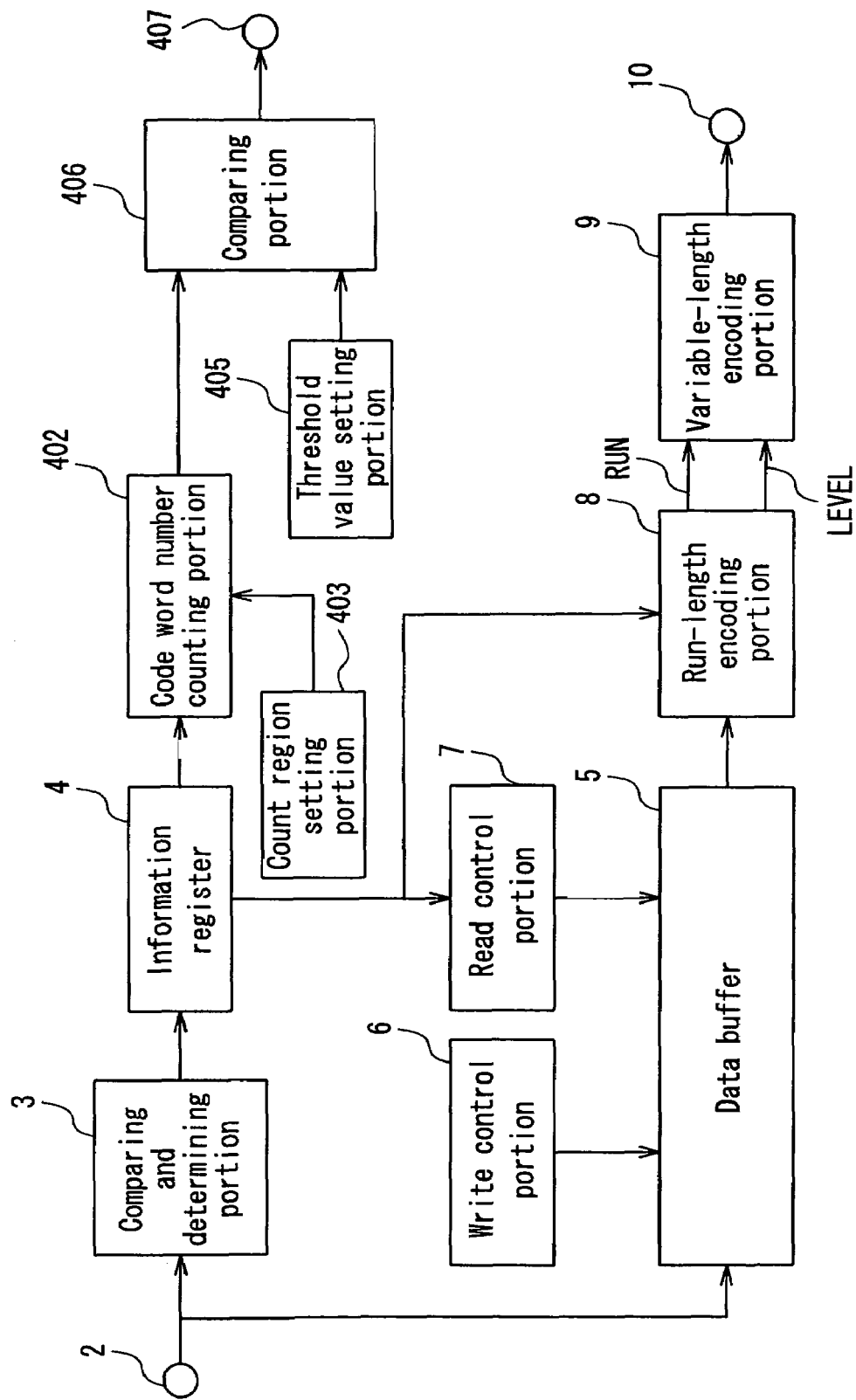
FIG. 24 is a diagram of another configuration of the encoding device according to the fifth embodiment of the present invention.

As shown in FIG. 24, it is also possible further to provide a threshold value setting portion 405 for setting a threshold value with respect to the counted value in the code word number counting portion 402, a comparing portion 406 for comparing the counted value from the code word number counting portion 402 and the threshold value that is set by the code word number threshold value setting portion 405, and an output portion 407 for outputting information indicating the results of the comparison by the comparing portion 406.

Figure 25:
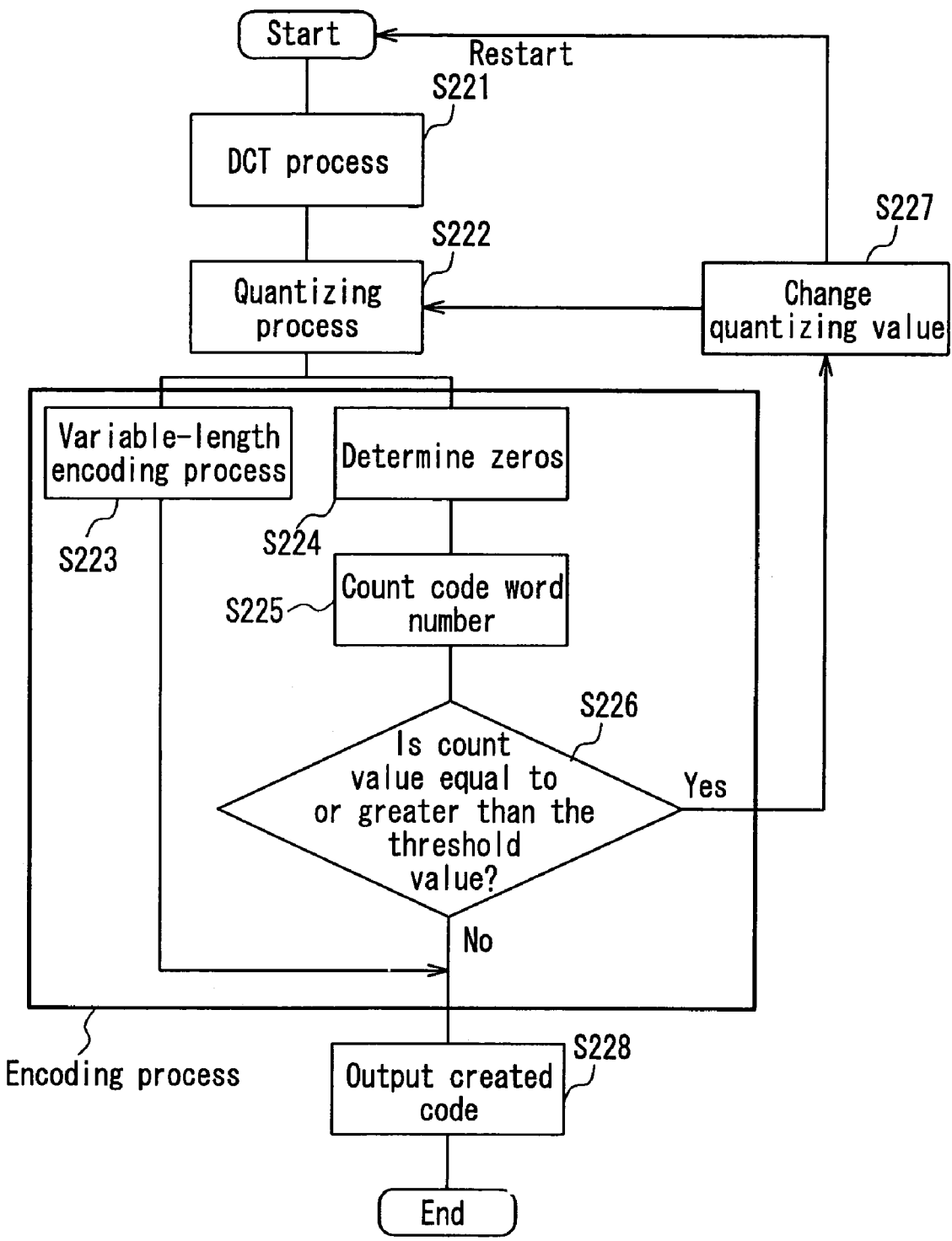
FIG. 25 is a flowchart of code data amount control in the encoding device according to the fifth embodiment of the present invention.

By doing this, as shown in the process flowchart of FIG. 25, it becomes possible to determine the size of the counted number during the encoding process, and thus it is not necessary to use an external processor, for example, and rate control of the encoded data can be carried out in block units.

By adopting the above described configuration, if rate control of the encoded data is carried out during variable-length encoding, then it becomes possible to perform encoding again without waiting for the variable-length encoding process to end, and thus the encoding process can be made faster by the amount that the waiting time is shortened.

Sixth Embodiment

An encoding device according to a sixth embodiment of the present invention is described below with reference to the drawings. It should be noted that structural components similar to those of the first embodiment have been assigned identical reference numerals, and thus detailed description thereof is omitted. The sixth embodiment is also described using a case where one block is made of 8×8 data units.

Figure 26:
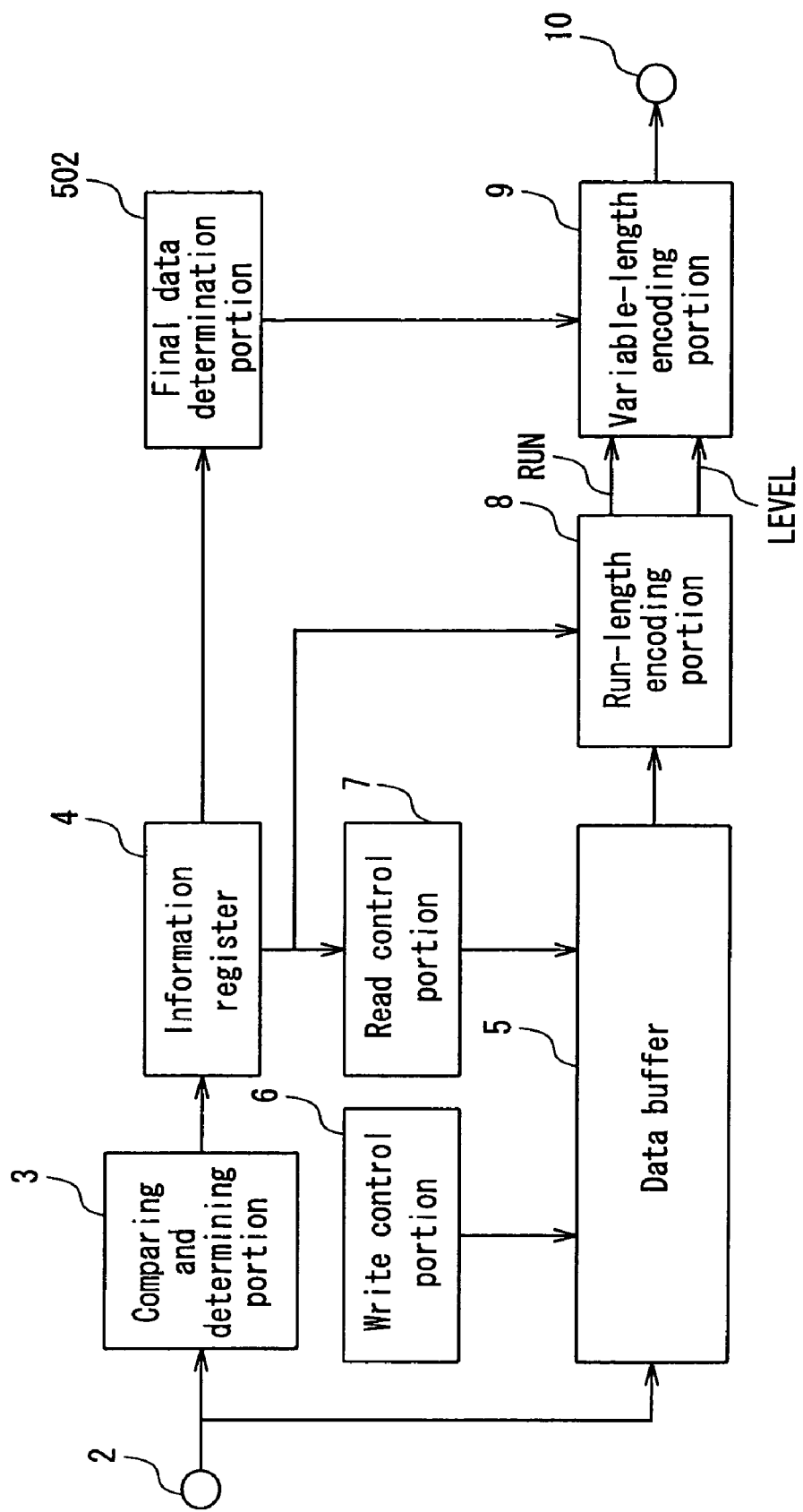
FIG. 26 is a diagram of a configuration of an encoding device according to a sixth embodiment of the present invention.

FIG. 26 schematically shows the encoding device according to the sixth embodiment of the present invention. Compared to the first embodiment, the sixth embodiment is characterized in the provision of a final data determination portion 502 for determining whether the information indicating data having a value that is not 0 (zero) stored in the information register 4 is the information indicating the last data having a value that is not 0 (zero) in that block. It should be noted that the input portion 2, the comparing and determining portion 3, the information register 4, the write control portion 6, and the read control portion 7 operate as in the first embodiment.

At the same time that the read control portion 7 outputs the address for reading out the last data in the current block having a value that is not 0 (zero) to the data buffer 5, the final data determination portion 502 determines whether that data are the last data in the current block having a value that is not 0 (zero) based on the information stored in the information register 4, and outputs information on the results of this determination to the variable-length encoding portion 9.

Thus, by allowing the final data determination portion 502 to determine the last data in the current block having a value that is not 0 (zero) based on the information stored in the information register 4, the variable-length encoding portion 9 can be compatible with three-dimensional variable-length encoding, which is used in MPEG-4, for example, carried out using the LEVEL signal indicating the size of the data value, the RUN signal indicating the run-length, and the LAST signal indicating the final data information.

Seventh Embodiment

An encoding device according to a seventh embodiment of the present invention is described below with reference to the drawings. It should be noted that structural components similar to those of the first embodiment have been assigned identical reference numerals, and thus detailed description thereof is omitted. The seventh embodiment is also described using a case where one block is assumed to be made of 8×8 data units.

Figure 27:
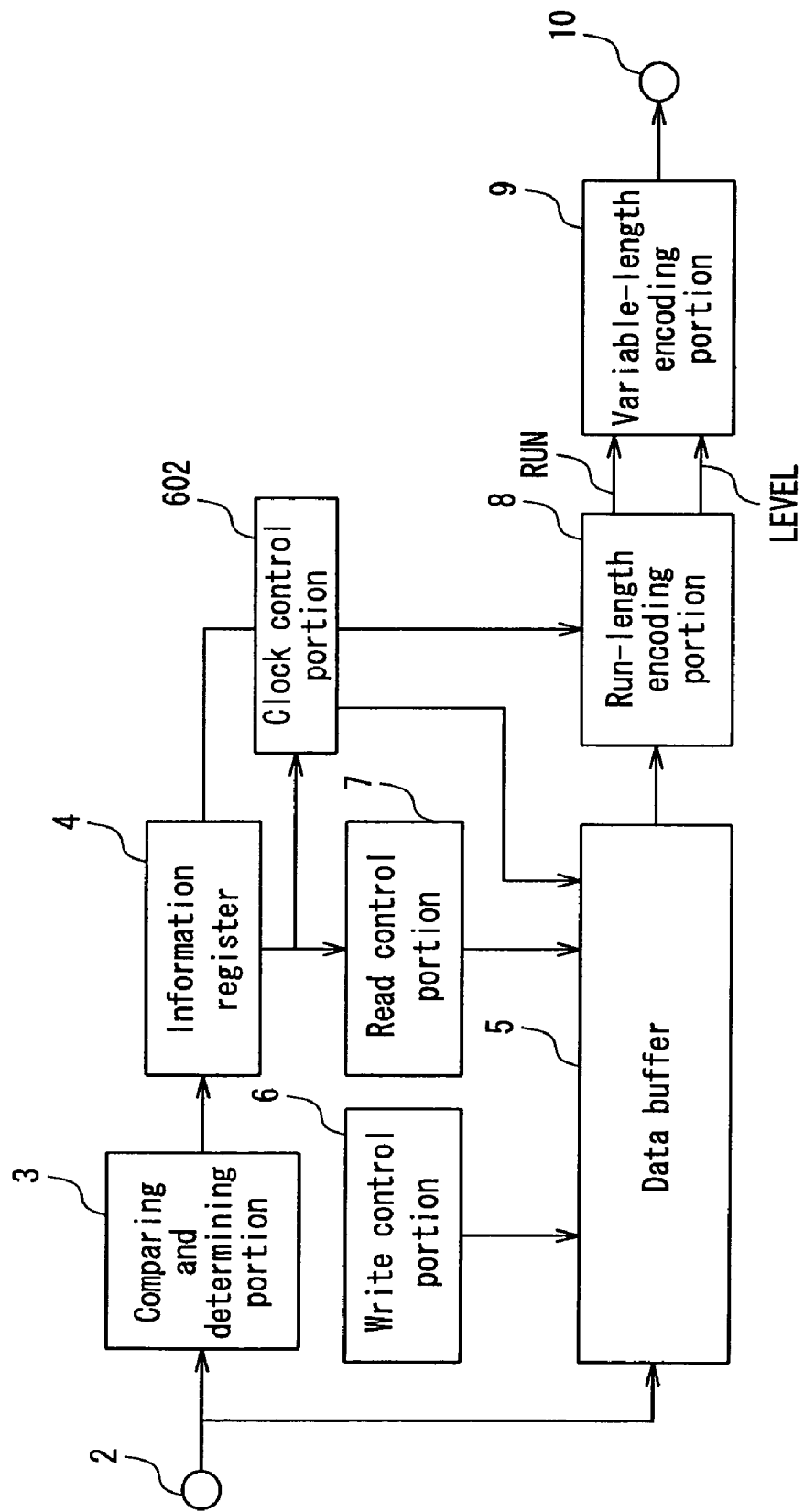
FIG. 27 is a diagram of a configuration of an encoding device according to a seventh embodiment of the present invention.

FIG. 27 schematically shows the encoding device according to the seventh embodiment of the present invention. Compared to the first embodiment, the seventh embodiment is characterized in the provision of a clock control portion 602 for controlling the clock supplied to the data buffer 5 based on the information stored in the information register 4. It should be noted that the input portion 2, the comparing and determining portion 3, the information register 4, the write control portion 6, and the read control portion 7 operate as in the first embodiment.

The clock control portion 602 can determine the number of data units having a value that is not 0 (zero) in the current block by counting the number of 1s, which indicate data having a value that is not 0 (zero), for example, based on the information stored in the information register 4.

Thus, the clock control portion 602 can supply a clock to the data buffer 5 of the period that the read control portion 7 outputs to the data buffer 5 the addresses of only the data having a value that is not 0 (zero), that is, only during the period of the data having a value that is not 0 (zero), based on the information stored in the information register 4.

Thus, by the clock control portion 602 supplying a clock to the data buffer 5 of only the number of data units having a value that is not 0 (zero) based on the information stored in the information register 4, power consumption can be curtailed, making the device a low power device.

Eighth Embodiment

An encoding device according to an eighth embodiment of the present invention is described below with reference to the drawings. The eighth embodiment achieves faster encoding speeds by separating the entire process of the first embodiment into a plurality of processes and performing advanced control such as pipeline processing. The eighth embodiment is also described using a case where one block is assumed to be made of 8×8 data units.

Figure 28:
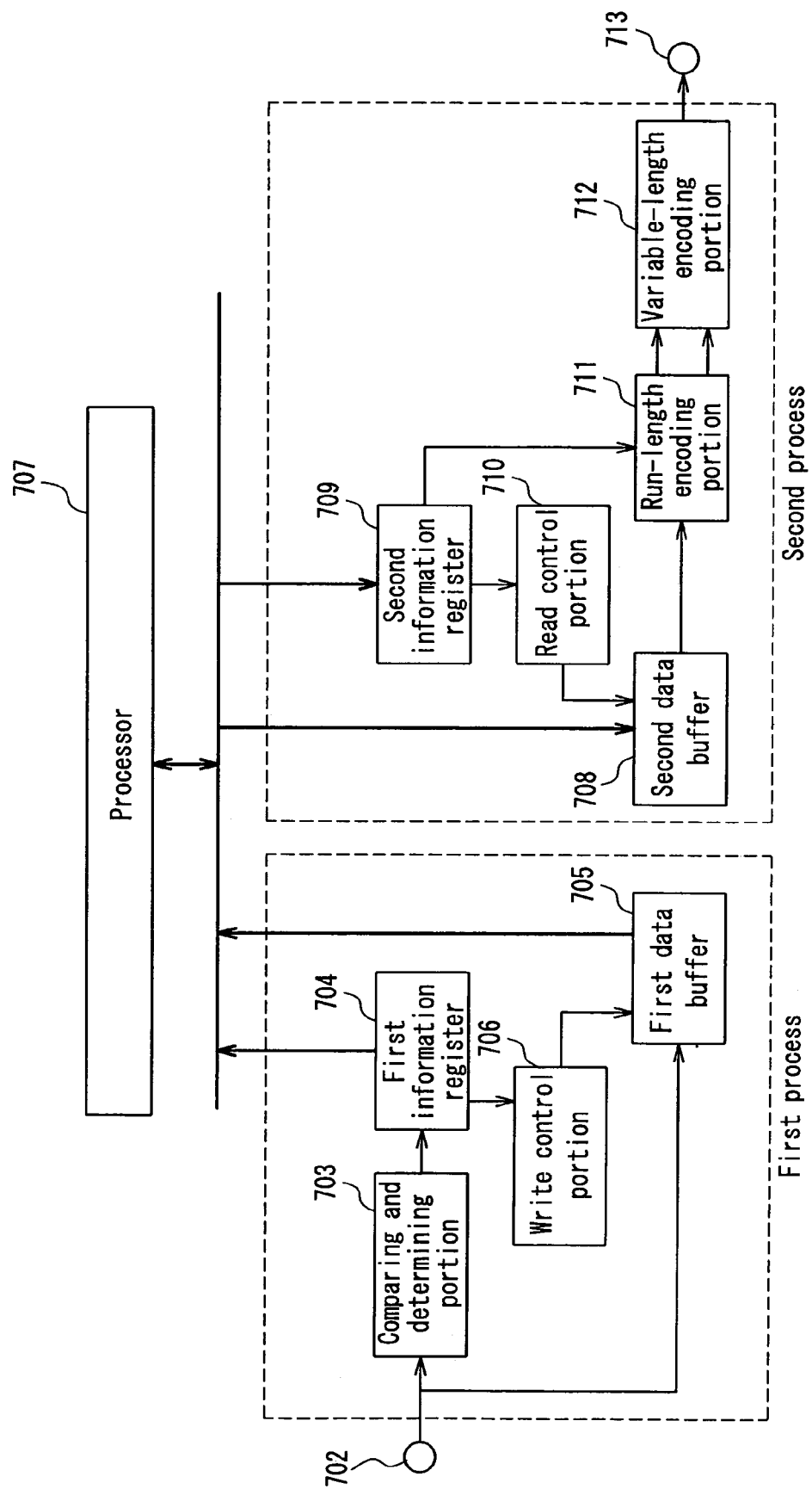
FIG. 28 is a diagram of a configuration of an encoding device according to en eighth embodiment of the present invention.

FIG. 28 schematically shows the encoding device according to the eighth embodiment of the present invention. FIG. 28 describes a case where the entire encoding process is separated into a first process up to the writing to the data buffer and a second process starting from the reading from the data buffer.

First, the reference numeral 702 denotes an input portion for sequentially inputting blocks each made of 8×8 data units. 703 denotes a comparing and determining portion for determining whether the data input from the input portion 702 has a value of 0 (zero). 704 denotes a first information register of 8×8 bits for storing information on whether the data has a value of 0 (zero) as determined by the comparing and determining portion 703. 705 denotes a first data buffer for storing data input from the input portion 702, and 706 denotes a write control portion for controlling the writing of data to the first data buffer 705.

Also, 707 denotes a processor for quantizing the information stored in the first information register 704 and the data stored in the first data buffer 705, and transferring these to a second information register 709 and a second data buffer 708.

Also, 710 denotes a read control portion for controlling the reading of data from the second data buffer 708. 711 denotes a run-length encoding portion for carrying out run-length encoding by calculating the number of consecutive data having a value of 0 (zero) based on the data that are read from the second data buffer 708 and the information that is stored in the second information register 709. 712 denotes a variable-length encoding portion for carrying out variable-length encoding by using a data pair made of the number of consecutive data having a value of 0 (zero) that are output from the run-length encoding portion 711 and those data, and 713 denotes an output portion for outputting encoded data from the variable-length encoding portion 712.

In the first process, first, the results of DCT, which is used in JPEG, for example, are input from the input portion 702 with one block made of 8×8 data serving as a single unit, and for all of the data that are input, the comparing and determining portion 703 determines whether their value is 0 (zero).

The results of the determination by the comparing and determining portion 703 are stored in the first information register 704 as 0s if the values are 0 (zero) and 1s if the values are not 0 (zero).

The write control portion 706, at the same time that the data that are input from the input portion 702 are evaluated by the comparing and determining portion 703, sequentially updates the addresses of the first data buffer 705, which is made of a RAM, for example, and writes the DCT coefficients that are input from the input portion 702.

The processor 707 reads 8×8 bits worth of information stored in the first information register 704, and with respect to the first data buffer 705, accesses the addresses that correspond to bits storing 1s in the first information register 704, reads out the data having a value that is not 0 (zero), and by shifting the addresses as shown in FIG. 6, consecutively reads out only data having a value that is not 0 (zero).

The processor 707 also creates quantized coefficients through a quantizing process after the data having a value that is not 0 (zero) have been read out from the first data buffer 705, and the quantized coefficients that are not 0 (zero) that are created at the same addresses as the addresses read from the first data buffer 705 are written to the second data buffer 708.

Further, information on whether the quantized coefficients that are written are 0 (zero) is written to the corresponding bits in the second information register 709. At this time, the processor 707 must set all bits in the second information register to '0' before writing to the second data buffer 708. That is, the second information register 709 is initialized.

Thereafter, the second read control portion 710, the second run-length encoding portion 711, and the second variable-length encoding portion 712 have the same operations as the corresponding read control portion 7, the run-length encoding portion 8, and the variable-length encoding portion 9 of the first embodiment.

In this way, by adopting a configuration in which the first process and the second process are arranged with the processor 707 between them, the time for the read process and the write process when transferring data during processing can be shortened. Consequently, an increase in the overall speed of the encoding process can be achieved.

It should be noted that the processor 707 may carry out the process of reading data from the data buffer 705 and the process of writing data to the second data buffer 708 in alternation one data at a time, and it may also carry out the writing process after the reading of data having a value that is not 0 (zero) is finished.

Moreover, the information register 109 can be configured so that all bits are automatically initialized to '0' after one block has been processed.

Figure 29:
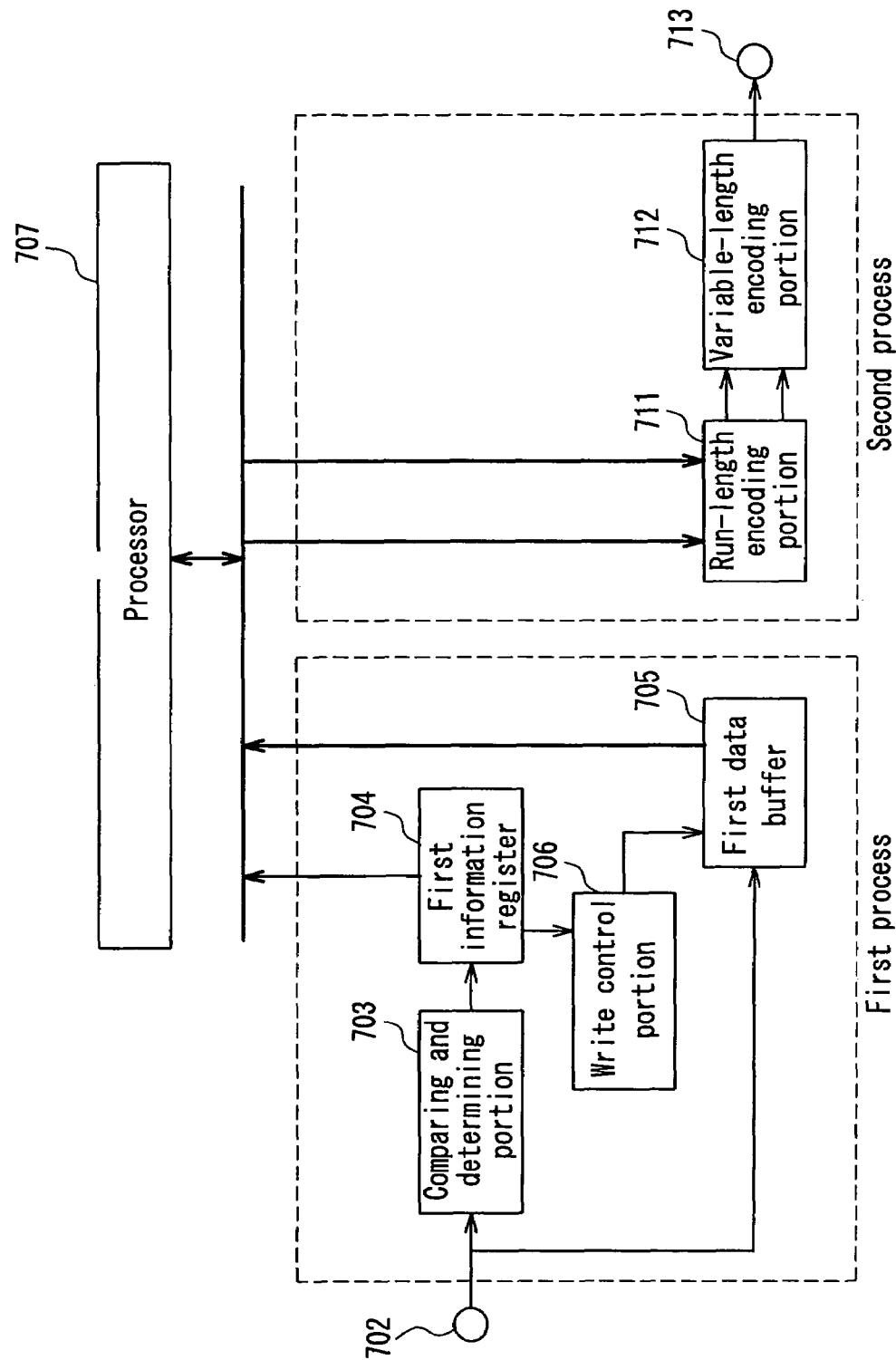
FIG. 29 is a diagram of another configuration of the encoding device according to the eighth embodiment of the present invention.
Figure 30:
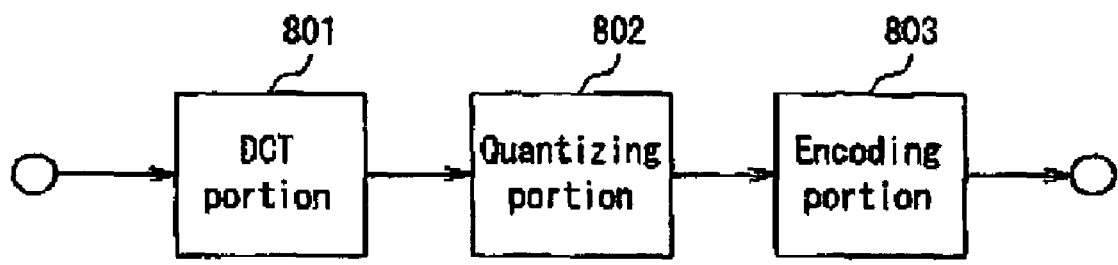
FIG. 30 is a diagram of a conventional image encoding device.
Figure 31:
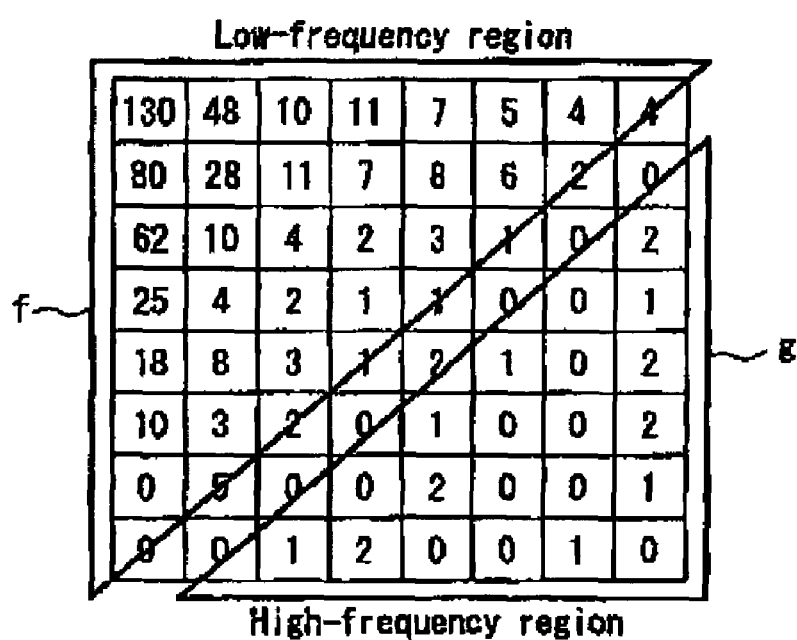
FIG. 31 is a diagram showing an example of DCT coefficient values.
Figure 32:
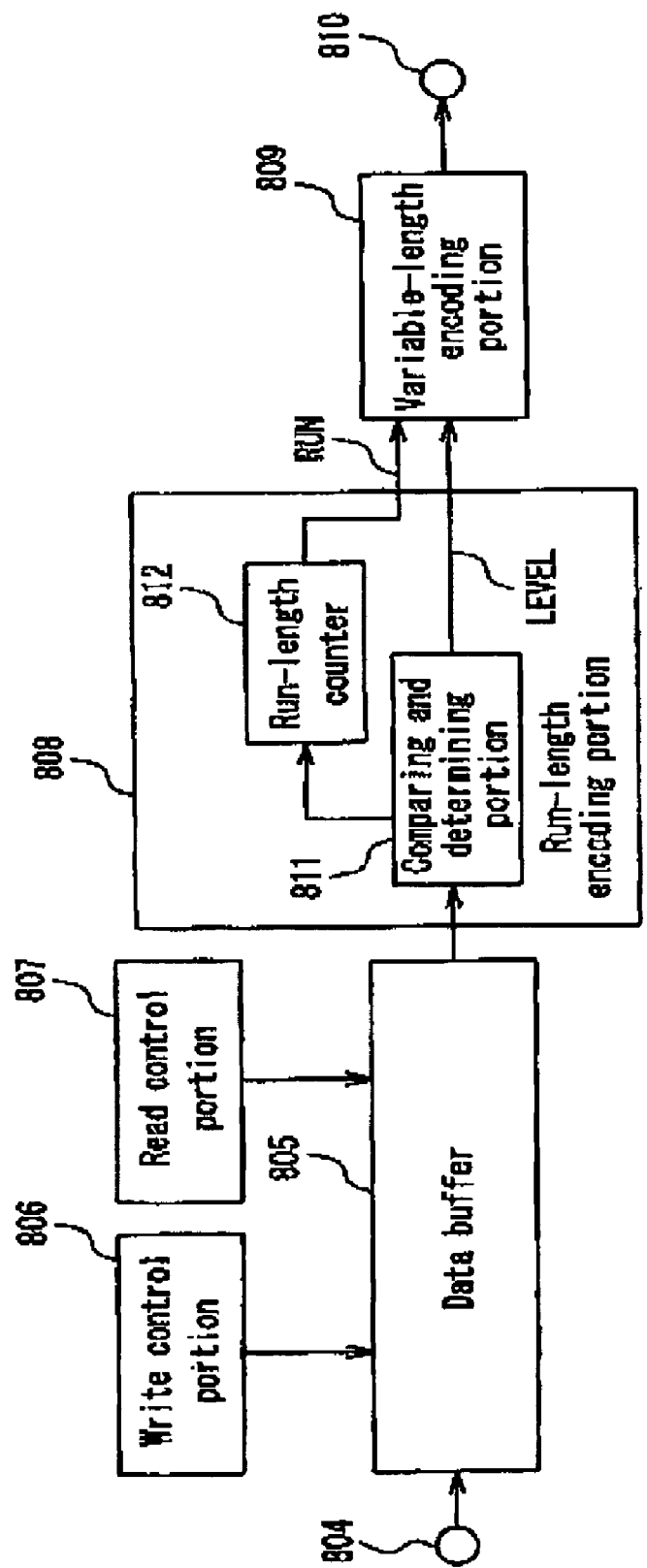
FIG. 32 is a diagram of the configuration of the encoding portion in the conventional image encoding device.
Figure 33:
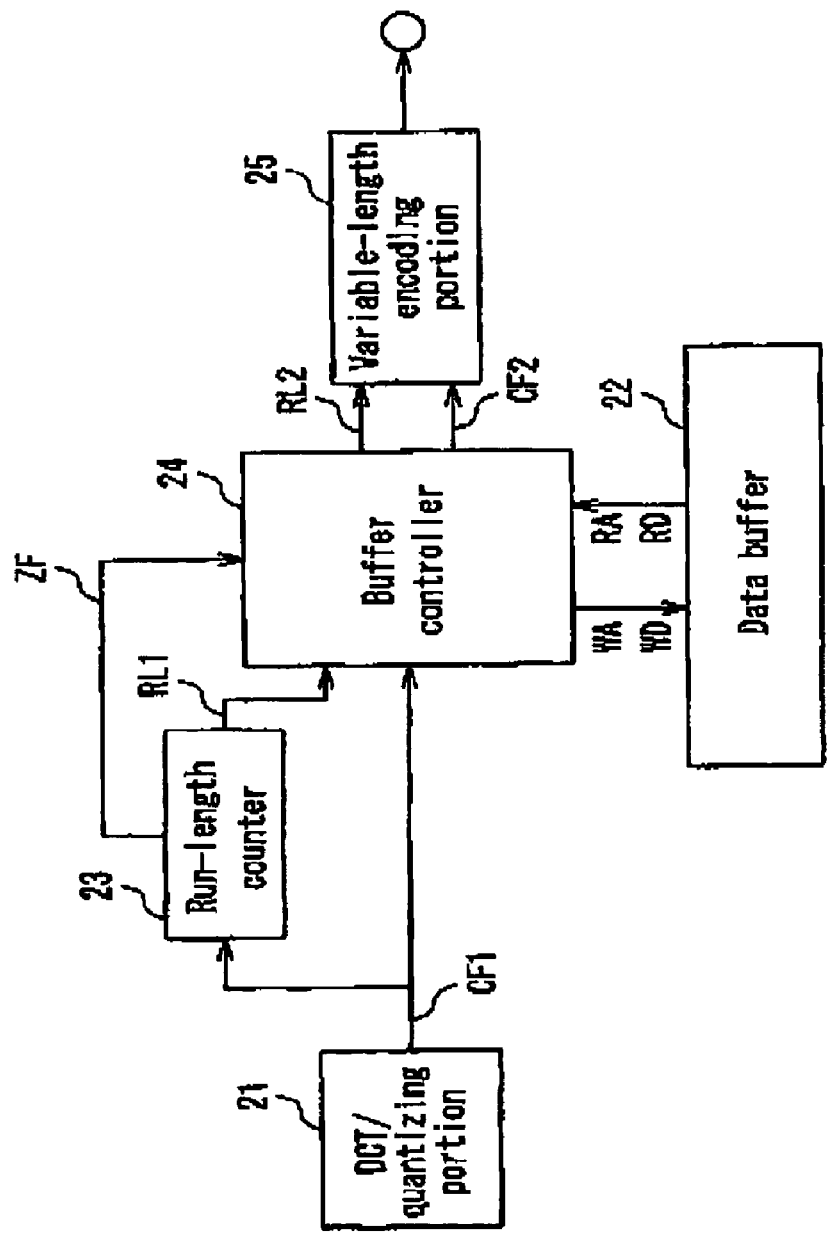
FIG. 33 is a diagram of another configuration of a conventional image encoding device.

Another conceivable configuration is that shown in FIG. 29. In FIG. 29, the second process is specialized for a specific encoding process.

That is, the process 707 reads out data having a value that is not 0 (zero) from the data buffer 705 based on the information stored in the information register 704 at the same time that it finds the interval between the current bit position in the information register 704 and the bit position in the information register 704 that corresponds to the data that was previously read out, for example, the interval a in FIG. 5, and counts the number of data units having a value of 0 (zero) quantizes them, thereby adding a '1' to the number of data units having a value of 0 (zero) if the quantized coefficient is 0 (zero) and reading the next data having a value that is not 0 (zero) from the data buffer 705 based on the information stored in the information register 704.

Then, quantized coefficients that are not 0 (zero) are output to the run-length encoding portion 711 and at the same time the number of data units having a value of 0 (zero) that have been counted is also output.

In this way, by adopting a configuration in which the processor is provided between the first process and the second process, the amount of time for reading and writing when transferring data during processing can be shortened, and thus the overall speed of the encoding process can be increased.

According to the encoding devices of the present invention that were discussed above, for example, by controlling the reading of data having a value that is not 0 (zero) from the data buffer based on the information stored in the information register to achieve a shorter read out time or a shorter write transfer time, the waiting time in the variable-length encoding process is shortened, allowing the overall encoding process to be made faster.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An encoding device performing run-length encoding and variable-length encoding, comprising:
   an input portion for sequentially inputting one block of m×n input data;
   a comparing and determining portion for determining for each individual data unit of the one block of m×n input data whether its value is 0 (zero);
   an information register for storing determination result information on the results of the determination by the comparing and determining portion;
   a data buffer for storing the one block of m×n input data;
   a write control portion for sequentially updating addresses in the data buffer and writes the one block of m×n input data to the data buffer, the write control portion updating addresses and writing the input data simultaneous with the comparing and determining portion determining whether each individual data unit of the input data has a value of 0 (zero);
   a read control portion for controlling selective reading output data from the data buffer in such a manner that only data having a value that is not 0 (zero) are selectively read out based on the determination result information stored in the information register;
   a run-length encoding portion for performing run-length encoding by calculating the interval between the bit position corresponding to the current data selectively read out in the information register and the bit position corresponding to the last data selectively read out in the information register at the same time that the read control portion selectively reads output data from the data buffer; and
   a variable-length encoding portion for performing variable-length encoding using as a data pair the output data that have been read selectively from the data buffer and the number of consecutive data having a value of 0 (zero) that is obtained by the run-length encoding portion,
   wherein the input data is written into the data buffer simultaneously with output data from the data buffer being transferred to the run-length encoding portion.

2. The encoding device according to claim 1,
   wherein the determination result information is stored in the information register in a zig-zag scan order with respect to the arrangement of the data in the block.

3. The encoding device according to claim 1,
   wherein the write control portion permits writing to the data buffer only if the comparing and determining portion has determined that the value of the data is not 0 (zero).

4. The encoding device according to claim 1,
   wherein the data buffer is configured so that it can store L (where L is a natural number of two or more)input data units per address, and
   wherein the encoding device further comprises a selection portion for selecting which of the L input data units that are read from the data buffer should be output to the run-length encoding portion based on the determination result information stored in the information register.

5. The encoding device according to claim 4,
   wherein the information register is configured so that it can store m×n bits of determination result information, and
   wherein the read control portion reads those L input data from the data buffer only if at least one bit of the determination result information corresponding L input data in the information register indicates that the value of the input data is not 0 (zero).

6. The encoding device according to claim 4,
   wherein the selection portion, of the bits of the information register, selects L input data read from the data buffer based on L bits of determination result information corresponding to L input data.

7. The encoding device according to claim 1,
wherein the information register is configured so that it can store m×n bits of determination result information in mutually different arrangement orders, and an information register group is constituted by a plurality of the information registers; and
wherein the encoding device further comprises:
a second input portion for inputting characteristic information indicating block characteristics of the data input by the input portion, and
a register selection portion for selecting any of the information registers of the information register group based on the characteristic information that is input from the second input portion.

8. The encoding device according to claim 2,
comprising an output switching portion having a plurality of process chains, in which one chain is constituted by the information register, the data buffer, the write control portion, and the read control portion, and which controls switching to the data buffer associated with which of the process chains from which to output to the run-length encoding portion;
wherein a process of writing to a data buffer of one of the process chains and a process of reading from a data buffer of another process chain are performed simultaneously.

9. The encoding device according to claim 1,
further comprising a code word number counting portion for counting a number of input data that are not 0 (zero) based on the determination result information of the information register.

10. The encoding device according to claim 9,
further comprising a region setting portion for setting a region within a block that is to be counted by the code word number counting portion.

11. The encoding device according to claim 9,
further comprising a threshold value setting portion for setting a threshold value of the count number of the code word number counting portion and a comparing portion for comparing the count number and the threshold number.

12. The encoding device according to claim 1,
further comprising a final data determination portion for outputting, when it is determined that an input data that is read from the data buffer is the last input data that is not 0 (zero) within the data block based on the determination result information stored in the information register, information indicating that that input data are the final data to the variable-length encoding portion.

13. The encoding device according to claim 1,
further comprising a clock control portion for controlling supply of a clock to the data buffer;
wherein the clock control portion supplies a clock to the data buffer only during a period when the values of the input data are not 0 (zero) based on the determination result information stored in the information register.

14. An encoding method in which run-length encoding and variable-length encoding are performed, comprising:
a step of sequentially inputting one block of m×n input data;
a step of performing a determination for each individual data unit of the m×n input data whether its value is 0 (zero);
a step of storing determination result information on the results of the determination to an information register;
a step of storing the m×n input data to a data buffer at the same time of performing the determination;
a step of selectively reading output data from the data buffer in such a manner that only data having a value that is not 0 (zero) are selectively read out based on the determination result information stored in the information register;
a step of performing run-length encoding by calculating the interval between the bit position corresponding to the current data selectively read out in the information register and the bit position corresponding to the last data selectively read out in the information register at the same time of selectively reading the output data; and
a step of performing variable-length encoding using as a data pair the output data selectively read from the data buffer and the number of consecutive data having a value of 0 (zero) obtained in the step of performing run-length encoding,
wherein input data is being stored in the data buffer at the same time output data is read from the data buffer.

15. The encoding method according to claim 14,
wherein a buffer that can store L (L is a natural number of two or more) data per address is used as the data buffer; and
wherein the step of selectively reading data from the data buffer includes
a step of selecting which data, of the L data read from the data buffer, to transfer to the run-length encoding process based on the determination result information stored in the information register, and
a step of transferring the selected data to the run-length encoding process.

16. The encoding method according to claim 14,
wherein the information register is configured so that it can store m×n bits of the determination result information in mutually different arrangement orders, and an information register group constituted by a plurality of the information registers is used;
wherein the encoding method further comprises:
a step of inputting characteristic information showing the block characteristics of the input data, and
a step of selecting an information register from the information register group based on the characteristic information that is input.

17. The encoding method according to claim 14, further comprising:
a step of simultaneously executing a plurality of process chains, each process chain including:
the step of storing the determination result information to the information register;
the step of storing the input data to the data buffer; and
the step of selectively reading data from the data buffer based on the determination results;
and controlling which data read out from the data buffers in what process chain of the plurality of process chains is transferred to the run-length encoding step;
wherein writing to the data buffer in one of the plurality of process chains and reading from a data buffer in another process chain are performed simultaneously.

18. The encoding method according to claim 14, further comprising:
a step of counting a number of input data whose values are not 0 (zero) based on the determination result information in the information register.

19. The encoding method according to claim 18, further comprising:
a step of setting a region within one block to be subjected to the counting.

20. The encoding method according to claim 18, further comprising:
   a step of setting a threshold value of a count number; and
   a step of comparing the count number and the threshold value.

21. The encoding method according to claim 14, further comprising:
   a step of determining whether an input data that is read from the data buffer is a last input data that is not 0 (zero) within the data block, based on the determination result information stored in the information register;
   wherein when it is determined that the input data are the last input data that is not 0 (zero), then information indicating that the input data are final data is transferred to the variable-length encoding step.

22. The encoding method according to claim 14, comprising:
   a step of controlling a clock supplied to the data buffer;
   wherein based on determination result information stored in the information register, a clock is supplied to the data buffer only during a period of data whose values are not 0 (zero).

23. The encoding device according to claim 1,
   wherein the input portion inputs the one block of m×n input data into the comparing and determining portion simultaneously or before the timing for inputting the one block of m×n input data into the data buffer.

* * * * *